United States Patent
Sakai et al.

(10) Patent No.: US 9,847,042 B2
(45) Date of Patent: Dec. 19, 2017

(54) EVALUATION METHOD, AND EVALUATION APPARATUS

(71) Applicant: FUJITSU LIMITED, Kawasaki-shi, Kanagawa (JP)

(72) Inventors: Miho Sakai, Yokohama (JP); Atsushi Oguchi, Kawasaki (JP)

(73) Assignee: FUJITSU LIMITED, Kawasaki (JP)

(*) Notice: Subject to any disclaimer, the term of this patent is extended or adjusted under 35 U.S.C. 154(b) by 139 days.

(21) Appl. No.: 14/573,719

(22) Filed: Dec. 17, 2014

(65) Prior Publication Data
US 2015/0194070 A1 Jul. 9, 2015

(30) Foreign Application Priority Data
Jan. 7, 2014 (JP) .................. 2014-001215

(51) Int. Cl.
G09B 19/00 (2006.01)
A63B 69/00 (2006.01)
G09B 9/00 (2006.01)
A63F 13/814 (2014.01)
A63F 13/213 (2014.01)
G06K 9/00 (2006.01)
G06T 7/254 (2017.01)
G06K 9/32 (2006.01)

(52) U.S. Cl.
CPC .......... *G09B 19/003* (2013.01); *A63F 13/213* (2014.09); *A63F 13/814* (2014.09); *G06K 9/00342* (2013.01); *G06T 7/254* (2017.01); *G09B 19/0015* (2013.01); *G09B 19/0038* (2013.01); *G06K 2009/3291* (2013.01); *G06T 2207/30196* (2013.01)

(58) Field of Classification Search
USPC ....................................... 434/250
See application file for complete search history.

(56) References Cited

U.S. PATENT DOCUMENTS

2007/0169614 A1   7/2007  Sasaki et al.
2013/0194182 A1   8/2013  Tarama et al.

FOREIGN PATENT DOCUMENTS

| JP | 2002-6866 | 1/2002 |
|----|-----------|--------|
| JP | 2002-35191 | 2/2002 |
| JP | 2002166051 | 6/2002 |
| JP | 2005-339100 | 12/2005 |
| JP | 2012073935 | 4/2012 |
| JP | 2013154123 | 8/2013 |
| JP | 2013154125 | 8/2013 |
| KR | 10-2007-0077110 | 7/2007 |

OTHER PUBLICATIONS

Korean Office Action dated Nov. 30, 2015 in corresponding Korean Patent Application No. 10-2014-0186946.
(Continued)

*Primary Examiner* — Kesha Frisby
(74) *Attorney, Agent, or Firm* — Staas & Halsey LLP

(57) ABSTRACT

A computer-readable recording medium stores therein an evaluation program, the evaluation program causing a computer to execute a process including, acquiring, from a plurality of captured images obtained by sequential image capturing, a motion of a person taking a beat in the plurality of captured images, or a timing at which the person takes the beat; and outputting an evaluation on a rhythm of the motion of the person based on a rhythm indicated by the acquired motion or the acquired timing.

9 Claims, 16 Drawing Sheets

(56) References Cited

OTHER PUBLICATIONS

Japanese Office Action dated Jul. 4, 2017 in corresponding Japanese Patent Application No. 2014-001215.
Takeda, H., *Audio Alignment, Beat Tracking, and Rhythm Recognition*, The Institute of Electronics, Information and Communication Engineers, Knowledge Base, vol. 2, Section 9, Chapter 2, 2-4, Online, Searched on Dec. 17, 2013, the URL http://www.ieice-hbkb.org/portal/doc_557.html (7 pp.).
Office Action, dated Jul. 28, 2017, in Chinese Application No. 201410822672.0 (21 pp.).

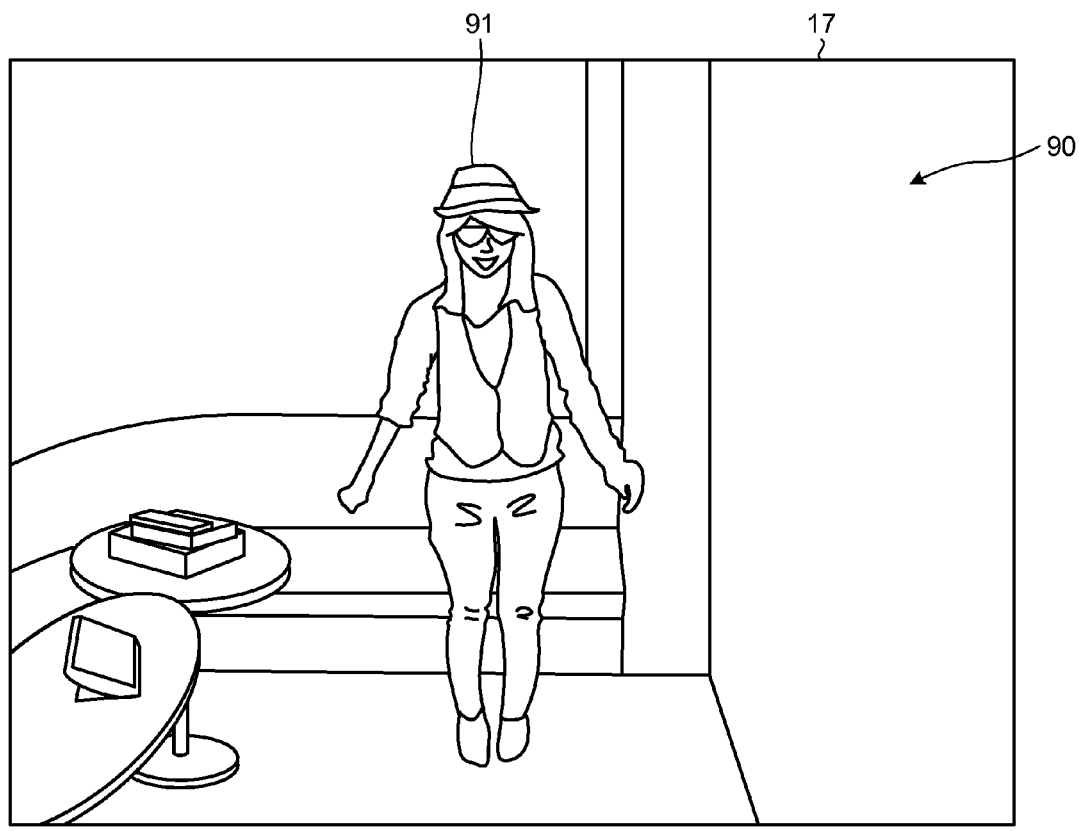

| FRAME NUMBER | BACKGROUND DIFFERENCE AMOUNT |
|---|---|
| FRAME 2 | 267000 |
| FRAME 3 | 266000 |
| ⋮ | ⋮ |

EVALUATION METHOD, AND EVALUATION APPARATUS

CROSS-REFERENCE TO RELATED APPLICATION

This application is based upon and claims the benefit of priority of the prior Japanese Patent Application No. 2014-001215, filed on Jan. 7, 2014, the entire contents of which are incorporated herein by reference.

FIELD

The embodiment discussed herein is related to an evaluation program, an evaluation method, and an evaluation apparatus.

BACKGROUND

There have been developed technologies for scoring a dance of a person and notifying the person of the scoring result.

Examples of the technologies for scoring and evaluating a dance of a person may include a technology for scoring a dance of a trainee. To quantitatively evaluate a dance, the technology acquires motion feature quantities from an image of a trainee of the dance and a model image of a trainer and analyses the acquired feature quantities to compare their spectra.

Japanese Laid-open Patent Publication No. 2012-073935

To score or evaluate a dance of a person, it is desired to extract a timing at which the person takes a rhythm, that is, a motion or a timing at which the person takes a beat. The conventional technology described above, however, may possibly fail to readily extract a motion or a timing at which a person takes a beat because of a large amount of processing for the analysis and to evaluate a tempo of a motion of the person.

In an aspect, a dance of a person is scored by capturing a motion of the person with a camera, analyzing a moving image obtained by the capturing with a computer, and extracting a rhythm of the person, for example. In a specific method, for example, a part of the face and the body of the person or an instrument used by the person, such as maracas, are recognized from the moving image by a predetermined recognition technology, such as template matching. This generates time-series data of a moving amount of the recognized part of the face and the body or the recognized instrument. Subsequently, a Fourier analysis or the like is performed on the time-series data, thereby extracting a rhythm of the person from components in a specific frequency band. By comparing the extracted rhythm of the person with a reference rhythm, for example, the dance of the person may be scored based on the comparison result. In the case of using template matching to recognize a part of the face and the body of the person or an instrument used by the person, such as maracas, from the moving image in the aspect above, for example, comparison between a template and a part of the moving image is repeatedly performed. This increases the amount of processing for the analysis, thereby increasing processing load of the computer.

SUMMARY

According to an aspect of an embodiment, a non-transitory computer-readable recording medium stores therein an evaluation program, the evaluation program causing a computer to execute a process including, acquiring, from a plurality of captured images obtained by sequential image capturing, a motion of a person taking a beat in the plurality of captured images, or a timing at which the person takes the beat; and outputting an evaluation on a rhythm of the motion of the person based on a rhythm indicated by the acquired motion or the acquired timing.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 2 is an example diagram of a frame;
FIG. 3 is an example diagram of timing data.

DESCRIPTION OF EMBODIMENTS

Preferred embodiments of the present invention will be explained with reference to accompanying drawings. The embodiments are not intended to limit the disclosed technology and may be optionally combined as long as no inconsistency arises.

[a] First Embodiment

Figure 1:
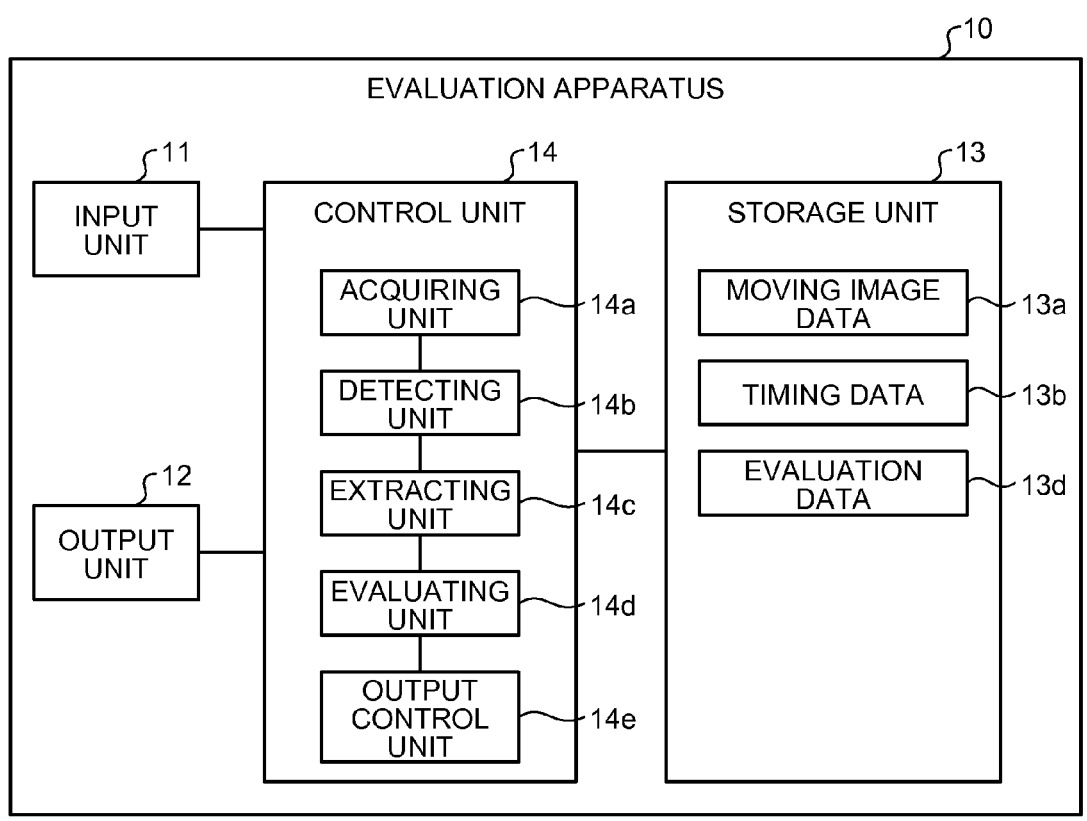
FIG. 1 is an example diagram of a configuration of an evaluation apparatus according to a first embodiment.

Example of a Functional Configuration of an Evaluation Apparatus 10 According to a First Embodiment An evaluation apparatus 10 illustrated in an example in FIG. 1 extracts, from each frame of a moving image obtained by capturing a person who is dancing with a camera, a timing at which a motion amount of the person temporarily decreases as a timing at which the person takes a rhythm, that is, a timing at which the person takes a beat. Thus, the timing at which a motion amount of the person temporarily decreases is extracted as a timing at which the person takes a beat. This is because a person temporarily stops a motion when taking a beat, whereby the motion amount temporarily decreases. The evaluation apparatus 10 can extract a timing at which a person takes a beat without performing recognition processing for recognizing a part of the face and the body of the person or an instrument, that is, recognition processing requiring a large amount of processing (high processing load). Therefore, the evaluation apparatus 10 can facilitate extracting a timing at which the person takes a beat. A rhythm means regularity of intervals of a tempo, for example. A tempo means a length of an interval between meters or beats, for example.

FIG. 1 is an example diagram of a configuration of the evaluation apparatus according to the first embodiment. As illustrated in the example in FIG. 1, the evaluation apparatus 10 includes an input unit 11, an output unit 12, a storage unit 13, and a control unit 14.

The input unit 11 inputs various types of information to the control unit 14. When the input unit 11 receives an instruction to perform extraction processing, which will be described later, from a user who uses the evaluation apparatus 10, for example, the input unit 11 inputs the received instruction to the control unit 14. Examples of a device of the input unit 11 may include a mouse, a keyboard, and a network card that receives various types of information transmitted from other devices (not illustrated) and inputs the received information to the control unit 14.

The output unit 12 outputs various types of information. When the output unit 12 receives an evaluation result of a tempo of a motion of a person from an output control unit 14e, which will be described later, the output unit 12 displays the received evaluation result or transmits the received evaluation result to a mobile terminal of the user or an external monitor, for example. Examples of a device of the output unit 12 may include a monitor and a network card that transmits various types of information transmitted from the control unit 14 to other devices (not illustrated).

The storage unit 13 stores therein various type of information. The storage unit 13 stores therein moving image data 13a, timing data 13b, and evaluation data 13d, for example.

The moving image data 13a is data of a moving image including a plurality of frames obtained by capturing a person who is dancing with a camera. Examples of the person may include a person who is singing a song to music reproduced by a karaoke machine and dancing to the reproduced music in a karaoke box. The frames included in the moving image data 13a are obtained by sequential image capturing with the camera and are an example of a captured image. FIG. 2 is an example diagram of a frame. In the example in FIG. 2, a frame 17 includes a person 91 who is singing a song and dancing to music in a karaoke box 90. The frame rate of the moving image data 13a may be set to a desired value. In the description below, the frame rate is set to 30 frames per second (fps).

The timing data 13b indicates time (timing) at which a person who is dancing takes a beat. In a case where the person included in the moving image data 13a is a person who is singing a song and dancing to reproduced music in a karaoke box, examples of the time may include time from the start of the music and the dance. This is because the dance is started simultaneously with the start of the music. FIG. 3 is an example diagram of timing data. The timing data 13b illustrated in the example in FIG. 3 includes items of "frame number", "time", and "timing to take a beat". In the item "frame number", a numerical value indicating the number of a frame from the start of the music and the dance is registered by an acquiring unit 14a, which will be described later. In the item "time", time from the start of the music and the dance is registered by an extracting unit 14c, which will be described later. In the item "timing to take a beat", "beat" is registered by the extracting unit 14c, which will be described later, in a case where the time registered in the item "time" is a timing at which the person takes a beat, whereas "no beat" is registered in a case where the time is not a timing at which the person takes a beat. In the first record of the timing data 13b illustrated in the example in FIG. 3, time of "0.033" second after the start of the music and the dance is associated with "beat" registered in the item "timing to take a beat". This indicates that the time is a timing at which the person takes a beat. In the second record of the timing data 13b illustrated in the example in FIG. 3, time of "0.066" second after the start of the music and the dance is associated with "no beat" registered in the item "timing to take a beat". This indicates that the time is not a timing at which the person takes a beat. The evaluation data 13d indicates an evaluation result of a tempo of a motion of a person evaluated by an evaluating unit 14d, which will be described later. The evaluation result will be described later.

The storage unit 13 is a semiconductor memory device such as a flash memory or a storage device such as a hard disk and an optical disk, for example.

The control unit 14 includes an internal memory that stores therein a computer program and control data specifying various types of processing procedures. The control unit 14 performs various types of processing with these data. As illustrated in FIG. 1, the control unit 14 includes the acquiring unit 14a, a detecting unit 14b, the extracting unit 14c, the evaluating unit 14d, and an output control unit 14e.

The acquiring unit 14a acquires a difference between a first frame and a second frame captured prior to the first frame for each of a plurality of frames included in a moving image indicated by the moving image data 13a. The acquiring unit 14a also acquires a difference between a first frame and a third frame obtained by accumulating frames captured prior to the first frame for each of the frames included in the moving image indicated by the moving image data 13a.

An aspect of the acquiring unit 14a will be described. When the input unit 11 inputs an instruction to perform extraction processing, which will be described later, the acquiring unit 14a acquires the moving image data 13a stored in the storage unit 13, for example.

The acquiring unit 14a uses a background difference method, thereby acquiring a difference between a first frame and a second frame captured prior to the first frame for each of a plurality of frames included in a moving image indicated by the moving image data 13a. The acquiring unit 14a, for example, uses a known function to accumulate background statistics, thereby acquiring a difference between a first frame and a third frame obtained by accumulating frames captured prior to the first frame for each of the frames.

Figures 4, 5:
FIG. 4 is an example diagram of a binarized image.
FIG. 5 is an example diagram of association between a background difference amount and a frame number.

The following describes processing performed in a case where the acquiring unit 14a uses a function to accumulate background statistics. The acquiring unit 14a compares a frame with background information obtained from frames captured prior to the frame. The acquiring unit 14a generates a binarized image by determining a pixel with a change in luminance of equal to or lower than a threshold to be a black pixel and determining a pixel with a change in luminance of larger than the threshold to be a white pixel. The generated information is not limited to a binarized image composed of white and black pixels as long as it can be determined whether a change in luminance is equal to or lower than the threshold or larger than the threshold. FIG. 4 is an example diagram of a binarized image. The acquiring unit 14a, for example, uses the function to accumulate background statistics, thereby comparing a frame 17 illustrated in the example in FIG. 2 with background information obtained from frames captured prior to the frame 17. Thus, the acquiring unit 14a generates a binarized image illustrated in the example in FIG. 4. The acquiring unit 14a then calculates the total number of white pixels (background difference amount) included in the generated binarized image as a motion amount of the person. As described above, the present embodiment uses the background difference amount as an index indicating a moving amount of the person. The acquiring unit 14a, for example, calculates the total number of white pixels included in the binarized image illustrated in the example in FIG. 4 as a motion amount of the person 91. Thus, the acquiring unit 14a acquires the background difference amount as the motion amount of the person for each frame. The acquiring unit 14a then associates the background difference amount with a frame number for each frame. FIG. 5 is an example diagram of association between the background difference amount and the frame number. In the example in FIG. 5, the acquiring unit 14a associates a frame number "2" with a background difference amount "267000" and associates a frame number "3" with a background difference amount "266000". Thus, the acquiring unit 14a acquires a difference between a first frame and a third frame obtained by accumulating frames captured prior to the first frame for each of the frames.

The acquiring unit 14a may use a code book method, thereby acquiring a difference between a first frame and a second frame captured prior to the first frame and a difference between the first frame and a third frame obtained by accumulating frames captured prior to the first frame.

Figure 6:
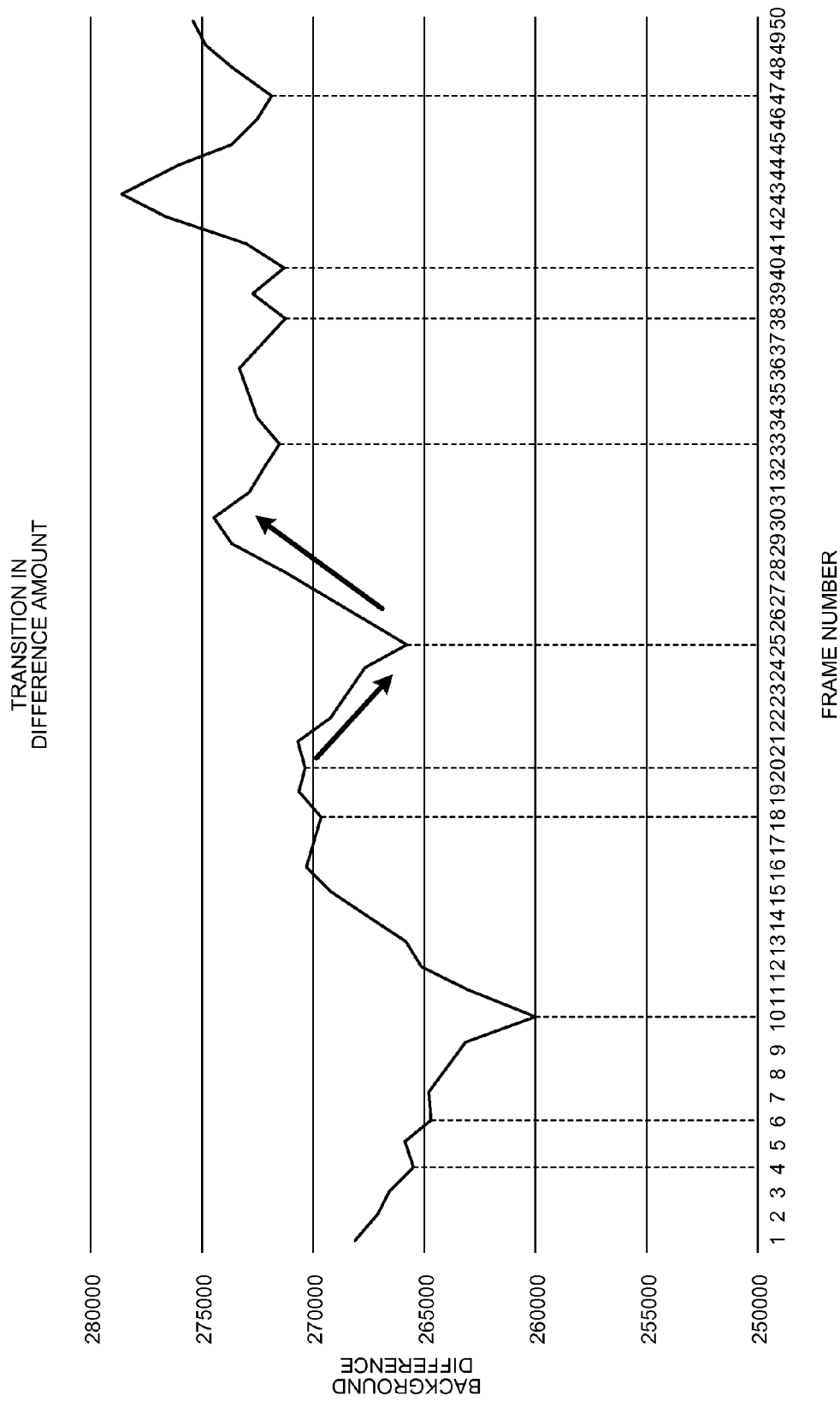
FIG. 6 is an example diagram for explaining processing performed by the evaluation apparatus according to the first embodiment.

The detecting unit 14b detects a timing at which an amount of a temporal change in a plurality of frames obtained by sequential image capturing temporarily decreases. An aspect of the detecting unit 14b will be described. The detecting unit 14b, for example, uses the information in which the frame number and the background difference amount are associated with each other by the acquiring unit 14a. The detecting unit 14b detects a frame having a background difference amount smaller than that of a preceding frame and smaller than that of a following frame. FIG. 6 is an example diagram for explaining processing performed by the evaluation apparatus according to the embodiment. FIG. 6 illustrates an example graph indicating the relation between the frame number and the background difference amount associated with each other by the acquiring unit 14a, where the abscissa indicates the frame number, and the ordinate indicates the background difference amount. The example graph in FIG. 6 illustrates the background difference amount of frames with a frame number of 1 to 50. In a case where the frame number and the background difference amount are associated with each other by the acquiring unit 14a as indicated by the example graph in FIG. 6, the detecting unit 14b performs the following processing. The detecting unit 14b detects the frame of the frame number "4" having a background difference amount smaller than that of the frame of the frame number "3" and smaller than that of the frame of the frame number "5". Similarly, the detecting unit 14b detects the frames of the frame numbers "6", "10", "18", "20", "25", "33", "38", "40", and "47".

The detecting unit 14b detects the time of capturing the detected frames as timings at which the amount of a temporal change in a plurality of frames temporarily decreases. The detecting unit 14b, for example, detects the time when the frames of the frame numbers "4", "6", "10", "18", "20", "25", "33", "38", "40", and "47" are captured as timings at which the amount of a temporal change in a plurality of frames temporarily decreases.

The extracting unit 14c extracts a motion of taking a beat made by a person included in the frames or a timing at which the person takes a beat based on the timings detected by the detecting unit 14b.

An aspect of the extracting unit 14c will be described. The extracting unit 14c, for example, extracts the following timing from the timings detected by the detecting unit 14b. The extracting unit 14c extracts a frame satisfying predetermined conditions from the frames captured at the timings detected by the detecting unit 14b. The extracting unit 14c extracts the time of capturing the extracted frame as a timing at which the person included in the frames takes a beat.

The following describes an example of a method for extracting a frame satisfying the predetermined conditions performed by the extracting unit 14c. The extracting unit 14c, for example, selects each of the frames corresponding to the timings detected by the detecting unit 14b (frames captured at the detected timings) as an extraction candidate frame. Every time the extracting unit 14c extracts one extraction candidate frame, the extracting unit 14c performs the following processing. The extracting unit 14c determines whether the background difference amount decreases from a frame a predetermined number ahead of the extraction candidate frame to the extraction candidate frame and increases from the extraction candidate frame to a frame a predetermined number behind the extraction candidate frame. If the extracting unit 14c determines that the background difference amount decreases from the frame the predetermined number ahead of the extraction candidate frame to the extraction candidate frame and increases from the extraction candidate frame to the frame the predetermined number behind the extraction candidate frame, the extracting unit 14c performs the following processing. The extracting unit 14c extracts the time of capturing the extraction candidate frame as a timing at which the person included in the frames takes a beat. In other words, the extracting unit 14c extracts a motion of taking a beat made by the person included in the extraction candidate frame from the motions of the person indicated by the respective frames. The extracting unit 14c performs the processing described above on all the frames corresponding to the timings detected by the detecting unit 14b.

The following describes a case where the predetermined number is "4" and the frame number and the background difference amount are associated with each other by the acquiring unit 14a as illustrated in the example graph in FIG. 6. In this case, because the background difference amount decreases from the frame of the frame number "21" to the frame of the frame number "25" and increases from the frame of the frame number "25" to the frame of the frame number "29", the extracting unit 14c performs the following processing. The extracting unit 14c extracts the time of capturing the frame of the frame number "25" as a timing at which the person included in the frames takes a beat. The extracting unit 14c also extracts a motion of taking a beat made by the person included in the frame of the frame number "25" from the motions of the person indicated by the respective frames. The predetermined number for the frame ahead of the extraction candidate frame and the predetermined number for the frame behind the extraction candidate frame may be set to difference values. In an aspect, the predetermined number for the frame ahead of the extraction candidate frame is set to "5", and the predetermined number for the frame behind the extraction candidate frame is set to "1", for example.

The extracting unit 14c registers a frame number, time corresponding to a timing at which the person takes a beat out of the times of capturing the frames, and "beat" in a manner associated with one another in the timing data 13b illustrated in FIG. 3. The extracting unit 14c also registers a frame number, time not corresponding to a timing at which the person takes a beat out of the times of capturing the frames, and "no beat" in a manner associated with one another in the timing data 13b illustrated in FIG. 3. Thus, the various types of information is registered in the timing data 13b, and the timing data 13b is used to evaluate a rhythm of the person indicated by the timing at which the person takes a beat, for example. The extracting unit 14c outputs registration information indicating that the timing data 13b is stored in the storage unit 13 to the evaluating unit 14d. The extracting unit 14c may output registration information indicating that the extracting unit 14c registers data relating to the timing of taking a beat in the timing data 13b every time it registers time corresponding to a timing of taking a beat and "beat" in a manner associated with each other or time not corresponding to a timing of taking a beat and "no beat" in a manner associated with each other for one frame in the timing data 13b. In this case, the evaluating unit 14d, which will be described later, makes an evaluation in real time.

Figure 7:
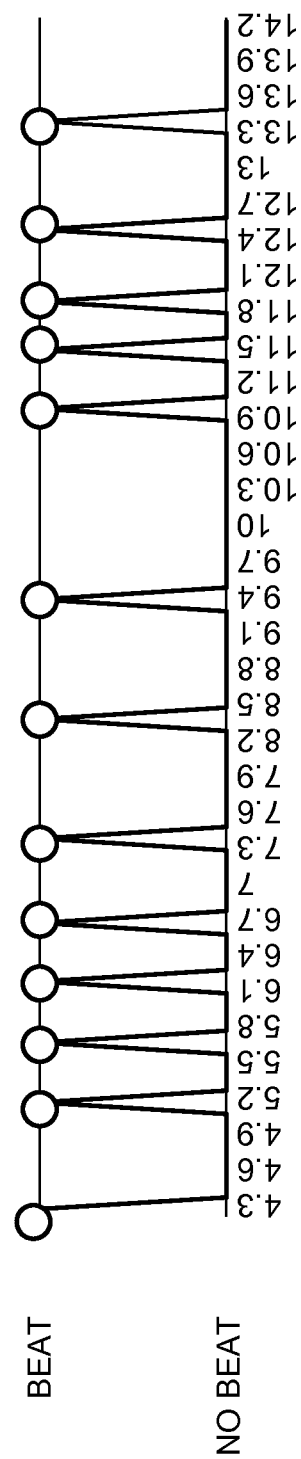
FIG. 7 is an example diagram of a graph obtained by plotting a timing at which a person takes a beat indicated by the timing data.

FIG. 7 is an example diagram of a graph obtained by plotting the timing at which the person takes a beat indicated by the timing data. In FIG. 7, the abscissa indicates time (second), and the ordinate indicates whether the person takes a beat. In the example in FIG. 7, whether it is a timing at which the person takes a beat is plotted at intervals of 0.3 second. In the example in FIG. 7, plotting is performed in every sequential nine frames as follows: a circle is plotted at a position of "beat" in a case where a timing at which the person takes a beat is present in timings at which the nine frames are captured; and no circle is plotted in a case where no timing at which the person takes a beat is present. In the example in FIG. 7, a circle is plotted at the position of "beat" correspondingly to time "4.3 seconds". This indicates that a timing at which the person takes a beat is present in nine frames each corresponding to time of one-thirtieth second in the period from 4.0 seconds to 4.3 seconds. In the example in FIG. 7, no circle is plotted correspondingly to time "4.6 seconds". This indicates that no timing at which the person takes a beat is present in nine frames each corresponding to time of one-thirtieth second in the period from 4.3 seconds to 4.6 seconds. The same applies to the other time. FIG. 7 conceptually illustrates an example of the timing data, and the timing data may be an appropriate aspect other than that illustrated in FIG. 7.

The evaluating unit 14d evaluates accuracy of rhythm intervals indicated by the timing of taking a beat. In other words, the evaluating unit 14d evaluates a difference between the timings of taking a beat in the timing data 13b.

An aspect of the evaluating unit 14d will be described. When the evaluating unit 14d receives registration information indicating that the timing data 13b is stored in the storage unit 13 from the extracting unit 14c, the evaluating unit 14d performs evaluation processing on the timing data 13b.

Figure 8:
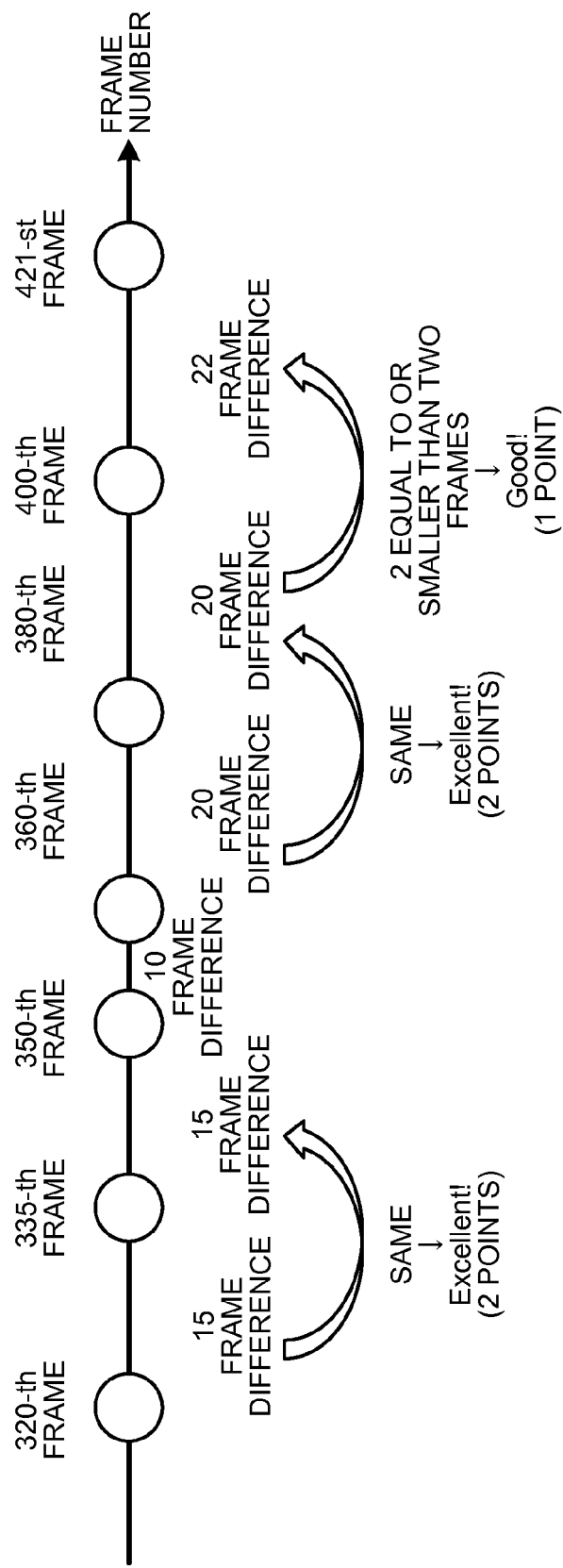
FIG. 8 is an example diagram of an evaluation on accuracy of rhythm intervals.

The evaluating unit 14d acquires frame numbers of a timing of taking a beat from the timing data 13b. Based on the frame numbers of a timing of taking a beat, the evaluating unit 14d calculates a frame difference corresponding to a difference between timings of taking a beat. The following describes a frame difference and rhythm intervals with reference to FIG. 8. FIG. 8 is an example diagram of an evaluation on accuracy of rhythm intervals. In FIG. 8, a timing of taking a beat is represented by a circle.

As illustrated in FIG. 8, the first frame difference is "15" between the 320-th frame and the 335-th frame, for example. The second frame difference is "15" between the 335-th frame and the 350-th frame. Because both the first and the second frame differences are "15" and a difference between the frame differences is "0", the evaluating unit 14d gives "Excellent!", which has high points of evaluation, for example. The points of evaluation may be determined as follows: "Excellent!" and two points are given in a case where the difference between the frame differences is 0; "Good!" and one point are given in a case where the difference between the frame differences is larger than 0 and equal to or smaller than two frames; and "Bad" and zero point are given in a case where the difference between the frame differences is equal to or larger than three frames, for example.

In the example in FIG. 8, the third frame difference is "10" between the 350-th frame and the 360-th frame. In this case, the evaluating unit 14d determines a difference "5" between the second frame difference "15" and the third frame difference "10", thereby giving "Bad" and zero point in the example described above. In terms of the fourth frame difference and subsequent frame differences, the evaluating unit 14d calculates a difference between each frame difference and a preceding frame difference in the same manner. Thus, the evaluating unit 14d determines points of each frame difference. The evaluating unit 14d adds the points of each frame difference, thereby calculating a score. The score is reset to an initial value "0" every single evaluation and corresponds to an accumulated value of the points of each frame difference.

The evaluating unit 14d determines whether the points of the differences of all the frame differences acquired from the timing data 13b have been determined. If the evaluating unit 14d has not determined the points of the differences of all the frame differences, the evaluating unit 14d determines the points for the next frame difference. If the evaluating unit 14d has determined the points of the differences of all the frame differences, the evaluating unit 14d derives an evaluation from the score, that is, the accumulated and added points. The evaluating unit 14d, for example, may derive the evaluation by using the score as the evaluation without any change. Alternatively, the evaluating unit 14d may derive the evaluation by calculating the score on the basis of 100 points based on Equation (1), for example.

$$\text{Scored Points (Out of 100)} = \text{Basic Points} + \frac{\text{Total Value of Good and Excellent}}{(\text{Number of Acquired Rhythms} - 1) \times \text{Points of Excellent}} \times (100 - \text{Basic Points}) \quad (1)$$

In Equation (1), "basic points" represent the least acquirable points, such as 50 points. "Total value of Good and Excellent" represents a score. "Number of acquired rhythms" represents the number of timings of taking a beat acquired from the timing data 13b. In Equation (1), the denominator in the fractional term corresponds to the maximum acquirable score. In a case where all the differences are determined to be "Excellent!", the scored points are calculated to be 100 points. Even in a case where all the differences are determined to be "Bad", Equation (1) provides 50 points, making it possible to maintain the motivation of a performer for a dance.

The evaluating unit 14d stores the derived evaluation in the storage unit 13 as the evaluation data 13d and outputs the evaluation to the output control unit 14e.

The output control unit 14e performs control so as to output an evaluation result. The output control unit 14e, for example, transmits the evaluation result to the output unit 12 so as to output the evaluation result from the output unit 12.

The control unit 14 may be provided as a circuit, such as an application specific integrated circuit (ASIC), a field programmable gate array (FPGA), a central processing unit (CPU), and a micro processing unit (MPU).

Flow of Processing

Figure 9:
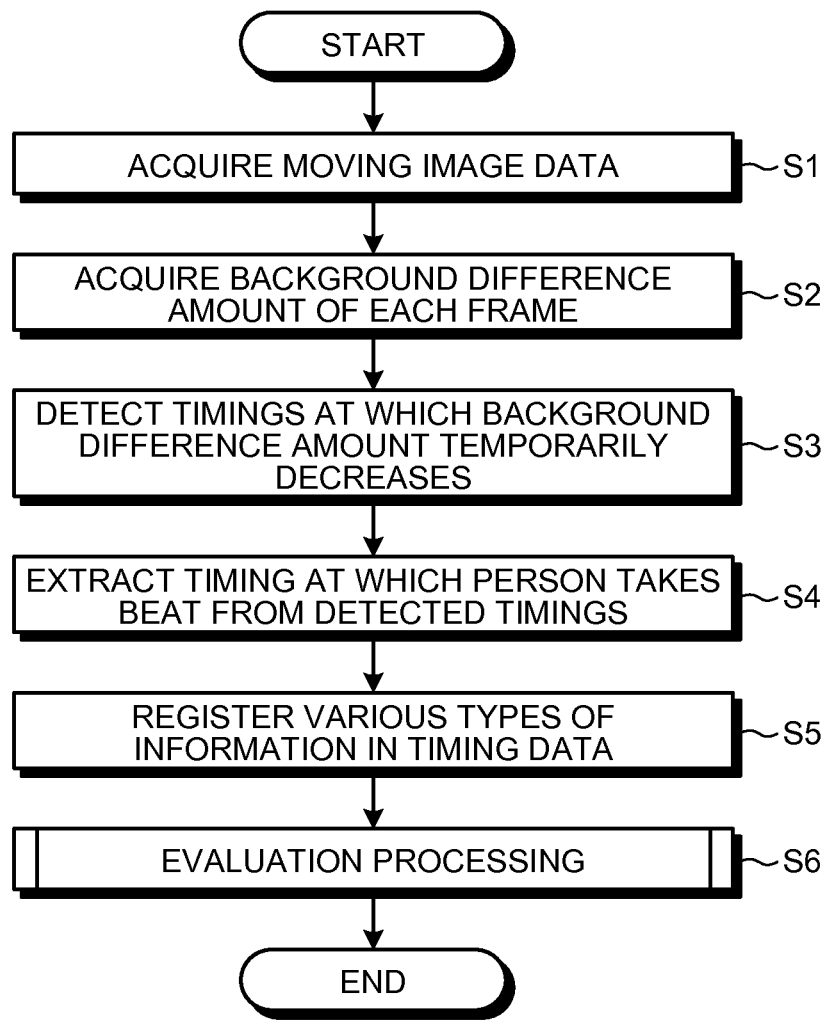
FIG. 9 is an example flowchart of processing performed by the evaluation apparatus according to the first embodiment.

The following describes a flow of processing performed by the evaluation apparatus 10 according to the first embodiment. FIG. 9 is an example flowchart of processing performed by the evaluation apparatus according to the first embodiment. The detection processing according to the first embodiment is performed by the control unit 14 when the input unit 11 inputs an instruction to perform evaluation processing to the control unit 14, for example.

As illustrated in FIG. 9, the acquiring unit 14a acquires the moving image data 13a stored in the storage unit 13 (S1). The acquiring unit 14a acquires a background difference amount of each of a plurality of frames as a motion amount of a person and associates the background difference amount with a frame number (S2).

The detecting unit 14b detects a timing at which an amount of a temporal change in the frames obtained by sequential image capturing temporarily decreases (S3). The extracting unit 14c extracts a motion of taking a beat made by the person included in the frames or a timing at which the person takes a beat based on the timings detected by the detecting unit 14b (S4).

The extracting unit 14c registers time corresponding to a timing at which the person takes a beat out of the times of capturing the frames and "beat" in a manner associated with each other in the timing data 13b illustrated in FIG. 3. The extracting unit 14c also registers time not corresponding to a timing at which the person takes a beat out of the times of capturing the frames and "no beat" in a manner associated with each other in the timing data 13b illustrated in FIG. 3 (S5). The extracting unit 14c outputs registration information to the evaluating unit 14d. If the evaluating unit 14d receives the registration information, the evaluating unit 14d performs evaluation processing (S6).

Figure 10:
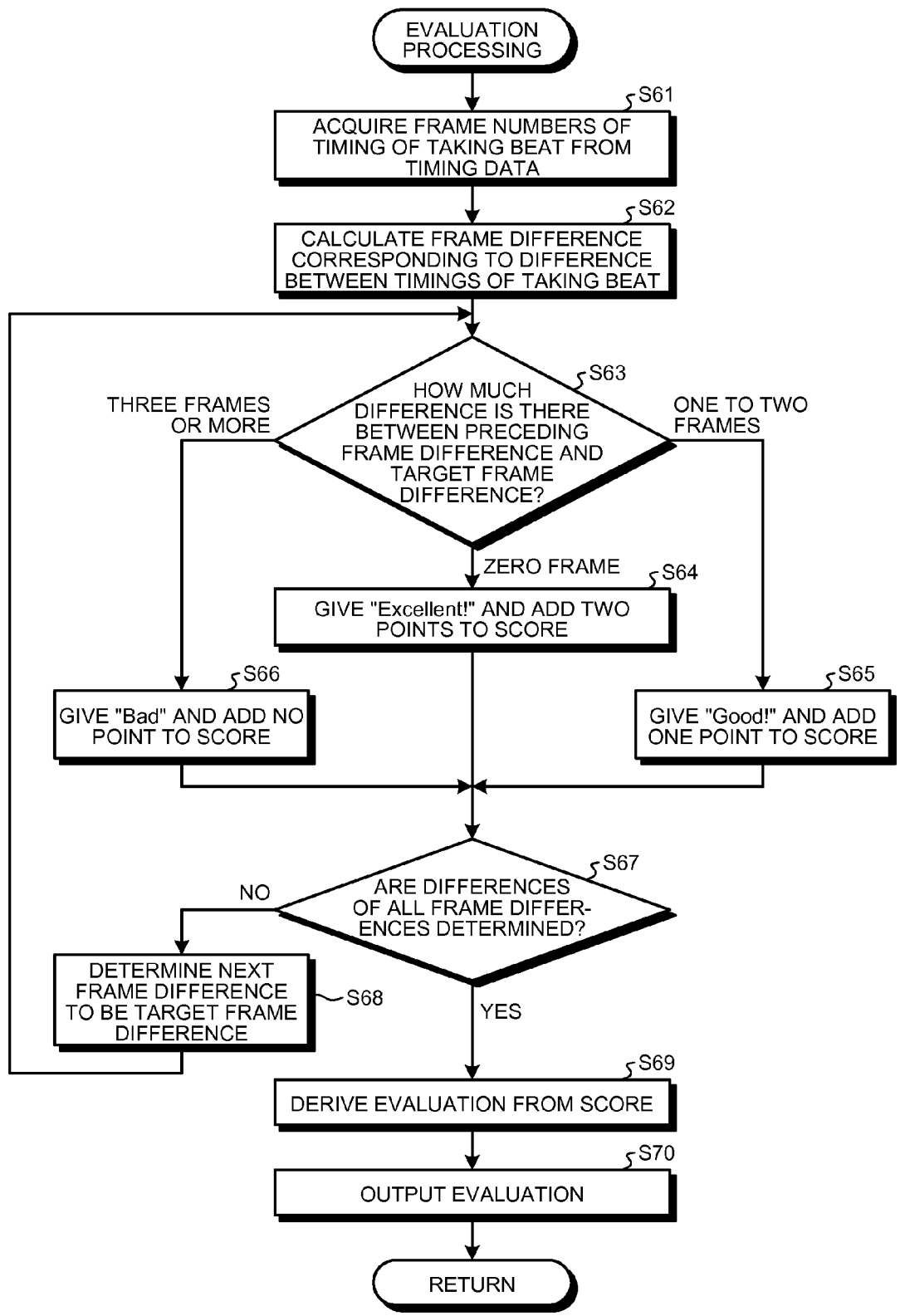
FIG. 10 is an example flowchart of evaluation processing according to the first embodiment.

The following describes the evaluation processing with reference to FIG. 10. FIG. 10 is an example flowchart of the evaluation processing according to the first embodiment. If the evaluating unit 14d receives registration information indicating that the timing data 13b is stored in the storage unit 13 from the extracting unit 14c, the evaluating unit 14d performs evaluation processing on the timing data 13b. The evaluating unit 14d acquires frame numbers of a timing of taking a beat from the timing data 13b (S61). Based on the frame numbers of a timing of taking a beat, the evaluating unit 14d calculates a frame difference corresponding to a difference between timings of taking a beat (S62).

The evaluating unit 14d calculates a difference between a preceding frame difference and a target frame difference, thereby determining points of the target frame difference (S63). If the difference between the frame differences is 0 (zero frame at S63), the evaluating unit 14d gives "Excellent!" and adds two points to the score (S64). If the difference between the frame differences is one or two frames (one to two frames at S63), the evaluating unit 14d gives "Good!" and adds one point to the score (S65). If the difference between the frame differences is three frames or more (three frames or more at S63), the evaluating unit 14d gives "Bad" and adds no point to the score (S66). The evaluating unit 14d adds the points of each frame difference, thereby calculating the score. The points are not necessarily determined based on the difference between the frame differences described above, such as zero frame, one to two frames, and three frames or more. The points may be determined based on a desired difference between the frame differences.

The evaluating unit 14d determines whether the points of the differences of all the frame differences acquired from the timing data 13b have been determined (S67). If the evaluating unit 14d has not determined the points of the differences of all the frame differences (No at S67), the evaluating unit 14d determines the next frame difference to be the target frame difference and performs the processing at Step S63 again (S68). If the evaluating unit 14d has determined the points of the differences of all the frame differences (Yes at S67), the evaluating unit 14d derives an evaluation from the score (S69). The evaluating unit 14d, for example, calculates how many points the score is worth out of 100 points based on Equation (1) as the evaluation. The evaluating unit 14d stores the derived evaluation in the storage unit 13 as the evaluation data 13d and outputs the evaluation to the output control unit 14e (S70). The output control unit 14e displays the evaluation received from the evaluating unit 14d on a monitor (not illustrated) via the output unit 12, for example. Thus, the accuracy of the rhythm intervals can be evaluated based on the points in the evaluation processing.

As described above, the evaluation apparatus 10 outputs an evaluation on a rhythm of a motion of a person included in a plurality of captured images obtained by sequential capturing based on a rhythm indicated by a motion of the person taking a beat or a timing at which the person takes a beat, which is extracted from the captured images. In other words, the evaluation apparatus 10 extracts a timing at which the person takes a beat, thereby evaluating the rhythm of the motion of the person without performing recognition processing for recognizing a part of the face and the body of the person or an instrument, that is, recognition processing requiring a large amount of processing. Thus, the evaluation apparatus 10 can evaluate the rhythm of the motion of the person from the captured images.

The evaluation apparatus 10 calculates a difference between a plurality of timings extracted based on the captured images. Furthermore, the evaluation apparatus 10 performs control such that the score of the evaluation increases with a decrease in the difference between the calculated difference between timings and a prior difference between timings. This makes it possible to enhance the evaluation as the person takes a beat at more constant intervals.

The evaluation apparatus 10 makes an evaluation such that the score of the evaluation increases with an increase in the number of calculated differences between timings with a difference from the prior difference between timings of equal to or smaller than a predetermined value. This makes it possible to enhance the evaluation correspondingly to the number of rhythms taken at constant intervals.

While the first embodiment makes an evaluation based on a difference between frame differences, that is, a difference between timings of taking a beat, the embodiment is not limited thereto. The embodiment may make an evaluation based on the number of consecutive frame differences with a difference from another frame difference of equal to or smaller than a predetermined value, for example.

[b] Second Embodiment

The following describes an embodiment that makes an evaluation based on the number of consecutive frame differences with a difference from another frame difference of equal to or smaller than a predetermined value as a second embodiment. Components identical to those in the evaluation apparatus 10 according to the first embodiment are denoted by like reference numerals, and overlapping explanation of the configuration and the operation will be omitted. An evaluation apparatus 20 according to the second embodiment is different from the evaluation apparatus 10 according to the first embodiment in that it makes an evaluation based on the number of consecutive frame differences with a difference from another frame difference of equal to or smaller than a predetermined value, that is, the number of consecutive rhythms.

Figure 11:
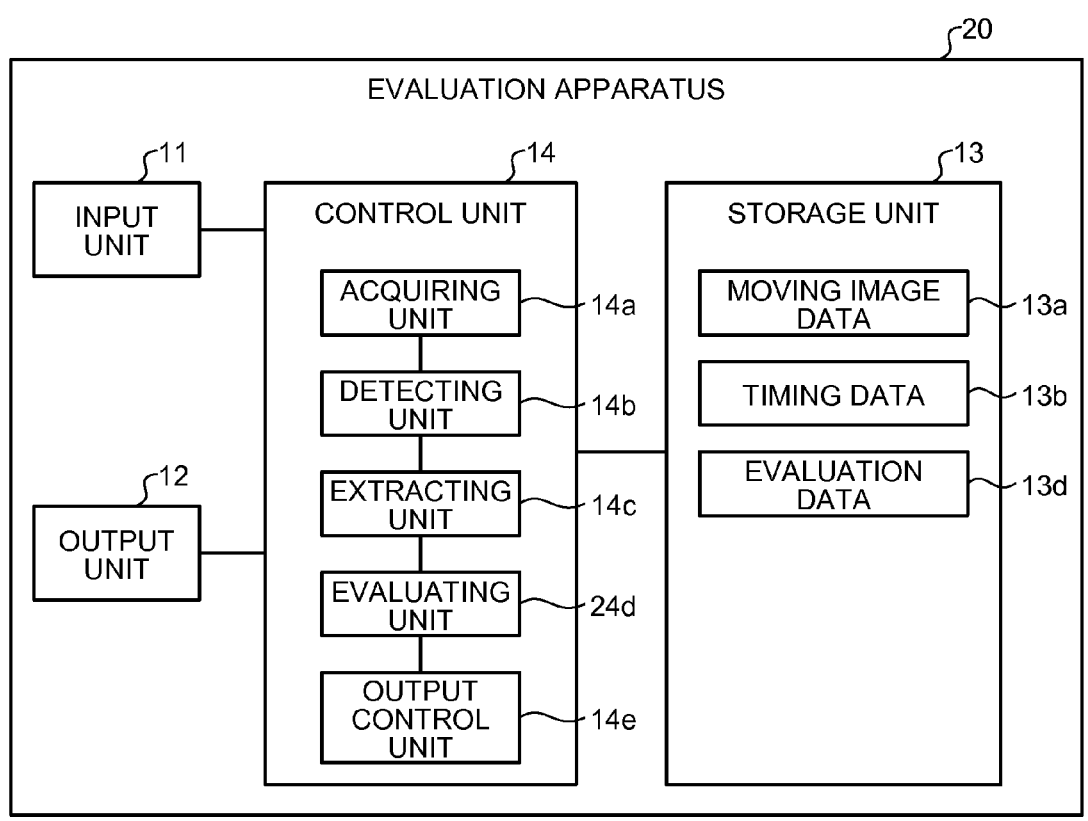
FIG. 11 is an example block diagram of a configuration of an evaluation apparatus according to a second embodiment.

FIG. 11 is an example block diagram of a configuration of the evaluation apparatus according to the second embodiment. The evaluation apparatus 20 according to the second embodiment is different from the evaluation apparatus 10 according to the first embodiment in that it includes an evaluating unit 24d instead of the evaluating unit 14d.

The evaluating unit 24d evaluates consecutiveness of rhythm intervals indicated by a timing of taking a beat. In other words, the evaluating unit 24d evaluates the consecutiveness of the difference between timings of taking a beat in the timing data 13b. When the evaluating unit 24d receives registration information indicating that the timing data 13b is stored in the storage unit 13 from the extracting unit 14c, the evaluating unit 24d performs evaluation processing on the timing data 13b.

Figure 12:
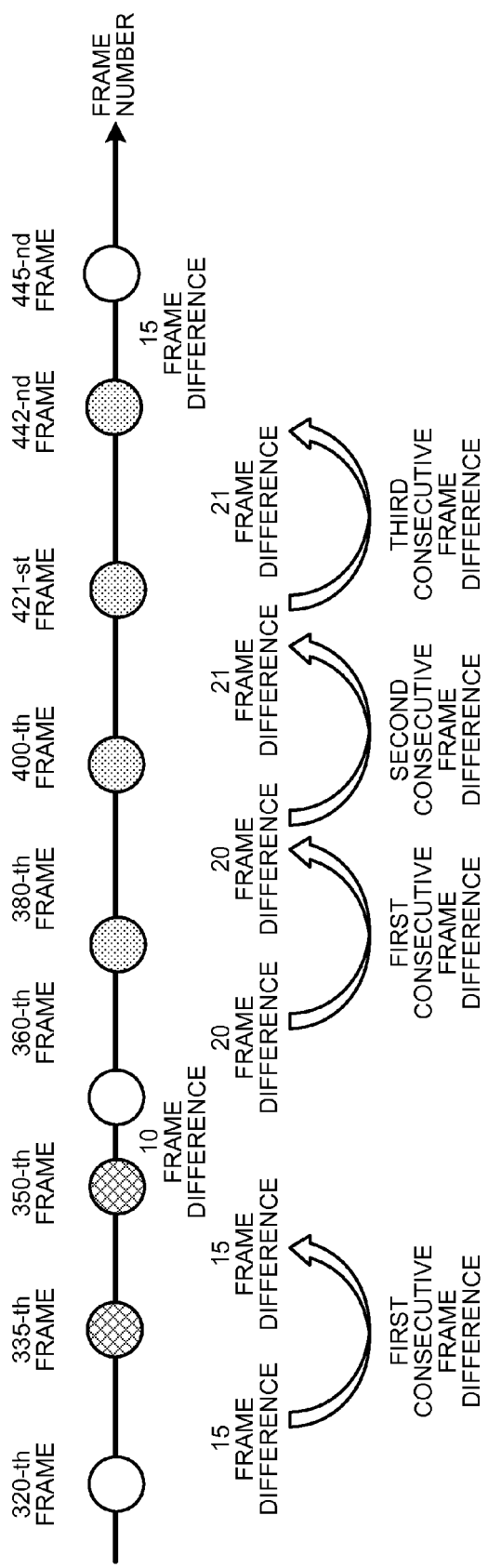
FIG. 12 is an example diagram of an evaluation on consecutiveness of rhythm intervals.

The evaluating unit 24d acquires frame numbers of a timing of taking a beat from the timing data 13b. Based on the frame numbers of a timing of taking a beat, the evaluating unit 24d calculates a frame difference corresponding to a difference between timings of taking a beat. The following describes a frame difference and consecutiveness of rhythm intervals with reference to FIG. 12. FIG. 12 is an example diagram of an evaluation on consecutiveness of rhythm intervals. In FIG. 12, a timing of taking a beat is represented by a circle.

As illustrated in FIG. 12, the fourth frame difference is "20" between the 360-th frame and the 380-th frame, for example. The fifth frame difference is "20" between the 380-th frame and the 400-th frame. The sixth frame difference is "21" between the 400-th frame and the 421-th frame. The seventh frame difference is "21" between the 421-th frame and the 442-th frame. The eighth frame difference is "15" between the 442-th frame and the 457-th frame.

At this time, the fourth to the seventh frame differences are "20", "20", "21", and "21". Thus, the evaluating unit 24d determines the difference with respect to a preceding frame difference of the fifth to the seventh frame differences to be "0", "1", and "0", respectively. In a case where the difference between a preceding frame difference and a target frame difference is equal to or smaller than a predetermined value, specifically, equal to or smaller than two frames, for example, the evaluating unit 24d determines that the rhythm continues and thus starts to count the number of consecutive rhythms. In a case where the difference between the preceding frame difference and the target frame difference is larger than the predetermined value, the evaluating unit 24d resets the count of the number of consecutive rhythms. Besides the case where the difference between the preceding frame difference and the target frame difference is equal to or smaller than the predetermined value, the evaluating unit 24d may also count the number of consecutive rhythms in a case where the difference between the first frame difference in consecutive rhythms and the target frame difference is equal to or smaller than a predetermined value. In this aspect, the evaluating unit 24d need not count a case where the rhythm intervals gradually become shorter, that is, where the tempo gradually becomes faster with the difference between the preceding frame difference and the target frame difference being equal to or smaller than the predetermined value as the number of consecutive rhythms, for example. Alternatively, the evaluating unit 24d need not count a case where the rhythm intervals gradually become longer, that is, where the tempo gradually becomes slower with the difference between the preceding frame difference and the target frame difference being equal to or smaller than the predetermined value as the number of consecutive rhythms, for example. This can reflect the tempo, which is specified by the motion of the person, gradually becoming faster or slower on the evaluation.

The evaluating unit 24d adds points corresponding to the number of consecutive rhythms to a score. The evaluating unit 24d may increase the points to be added correspondingly to the number of consecutive rhythms, such as one point in the case of the number of consecutive rhythms being 1 and two points in the case of the number of consecutive rhythms being 2. In other words, the evaluating unit 24d increases the score with an increase in the number of consecutive rhythms. The evaluating unit 24d also stores the number of consecutive rhythms in the storage unit 13.

The evaluating unit 24d determines whether the determination of the consecutiveness for the differences of all the frame differences acquired from the timing data 13b has completed. If the evaluating unit 24d has not completed the determination of the consecutiveness for the differences of all the frame differences, the evaluating unit 24d determines the consecutiveness for the difference of the next frame difference. If the evaluating unit 24d has completed the determination of the consecutiveness for the differences of all the frame differences, the evaluating unit 24d derives an evaluation from the score. The evaluating unit 24d, for example, may derive the evaluation by using the score as the evaluation without any change. Alternatively, the evaluating unit 24d may derive the evaluation by calculating the score on the basis of 100 points based on Equation (2), for example.

$$\text{Scored Points (Out of 100)} = \text{Basic Points} + \frac{\text{Number of Consecutive Rhythms} - 1}{\text{Number of Acquired Rhythms} - 1} \times \left(100 - \text{Basic Points}\right) \quad (2)$$

In Equation (2), "basic points" represent the least acquirable points, such as 50 points. "Number of consecutive rhythms" represents the total value of the number of consecutive rhythms. In a case where the rhythm continues once and then continues three times after an interruption as illustrated in FIG. 12, for example, the total value of the number of consecutive rhythms is "4".

The evaluating unit 24d stores the derived evaluation in the storage unit 13 as the evaluation data 13d and outputs the evaluation to the output control unit 14e.

The following describes a flow of processing performed by the evaluation apparatus 20 according to the second embodiment. The flow of processing performed by the evaluation apparatus 20 according to the second embodiment is the same as the operation of the evaluation apparatus 10 according to the first embodiment except for the evaluation processing performed by the evaluating unit 24d. The following describes the evaluation processing and omits the explanation of the other processing.

Figure 13:
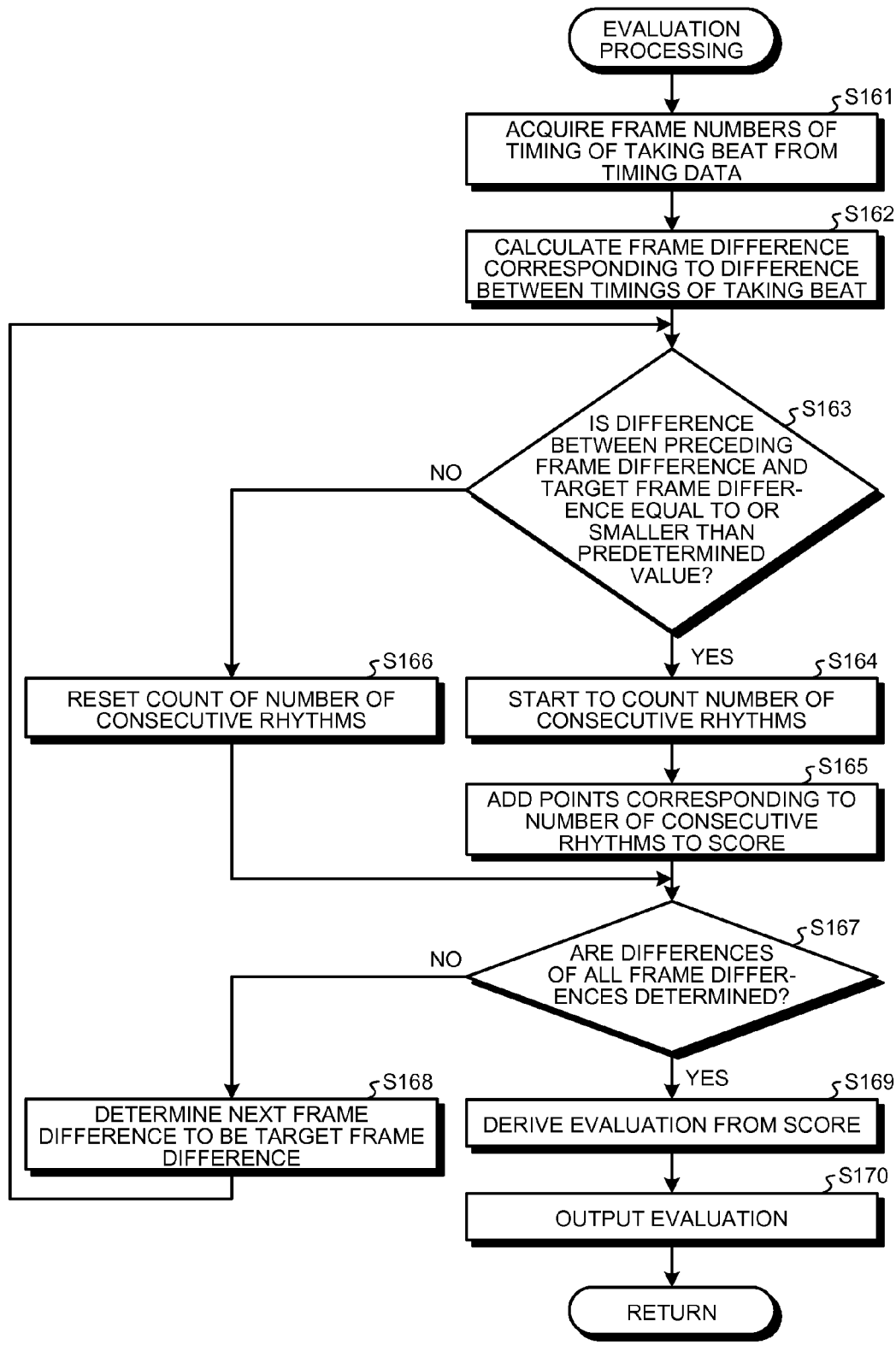
FIG. 13 is an example flowchart of evaluation processing according to the second embodiment.

FIG. 13 is an example flowchart of the evaluation processing according to the second embodiment. If the evaluating unit 24d receives registration information indicating that the timing data 13b is stored in the storage unit 13 from the extracting unit 14c, the evaluating unit 24d performs evaluation processing on the timing data 13b. The evaluating unit 24d acquires frame numbers of a timing of taking a beat from the timing data 13b (S161). Based on the frame numbers of a timing of taking a beat, the evaluating unit 24d calculates a frame difference corresponding to a difference between timings of taking a beat (S162).

The evaluating unit 24d determines whether a difference between a preceding frame difference and a target frame difference is equal to or smaller than a predetermined value, specifically, equal to or smaller than two frames, for example (S163). If the difference between the preceding frame difference and the target frame difference is equal to or smaller than the predetermined value (Yes at S163), the evaluating unit 24d determines that the rhythm continues and thus starts to count the number of consecutive rhythms (S164). The evaluating unit 24d adds points corresponding to the number of consecutive rhythms to the score (S165). If the difference between the preceding frame difference and the target frame difference is larger than the predetermined value (No at S163), the evaluating unit 24d resets the count of the number of consecutive rhythms (S166). The predetermined value is not limited to the number of frames described above and may be a desired number of frames.

The evaluating unit 24d determines whether the determination of the consecutiveness for the differences of all the frame differences acquired from the timing data 13b has completed (S167). If the evaluating unit 24d has not completed the determination of the consecutiveness for the differences of all the frame differences (No at S167), the evaluating unit 24d determines the next frame difference to be the target frame difference and performs the processing at Step S163 again (S168). If the evaluating unit 24d has completed the determination of the consecutiveness for the differences of all the frame differences (Yes at S167), the evaluating unit 24d derives an evaluation from the score (S169). The evaluating unit 24d, for example, calculates how many points the score is worth out of 100 points based on Equation (2) as the evaluation. The evaluating unit 24d stores the derived evaluation in the storage unit 13 as the evaluation data 13d and outputs the evaluation to the output control unit 14e (S170). The output control unit 14e displays the evaluation received from the evaluating unit 24d on a monitor (not illustrated) via the output unit 12, for example.

Thus, the consecutiveness of the rhythm intervals can be evaluated based on the points in the evaluation processing.

As described above, the evaluation apparatus 20 makes an evaluation such that the score of the evaluation increases correspondingly to the consecutiveness of a difference between timings having a value with a difference from a value of a prior difference between timings of equal to or smaller than a predetermined value. This makes it possible to enhance the evaluation correspondingly to the number of rhythms taken at constant intervals consecutively.

While the second embodiment makes an evaluation on the consecutiveness of a difference between frame differences, that is, a difference between timings of taking a beat, the embodiment is not limited thereto. The embodiment may evaluate a rhythm of a motion of a person by comparing a rhythm indicated by a timing at which the person takes a beat with a reference rhythm obtained by acquiring a difference between beats extracted from sound information, for example.

[c] Third Embodiment

The following describes an embodiment that makes an evaluation by comparing a rhythm indicated by a timing at which a person takes a beat with a reference rhythm as a third embodiment. Components identical to those in the evaluation apparatus 10 according to the first embodiment are denoted by like reference numerals, and overlapping explanation of the configuration and the operation will be omitted. An evaluation apparatus 30 according to the third embodiment is different from the evaluation apparatus 10 according to the first embodiment in that it makes an evaluation by comparing a rhythm indicated by a timing at which a person takes a beat with a reference rhythm.

Figure 14:
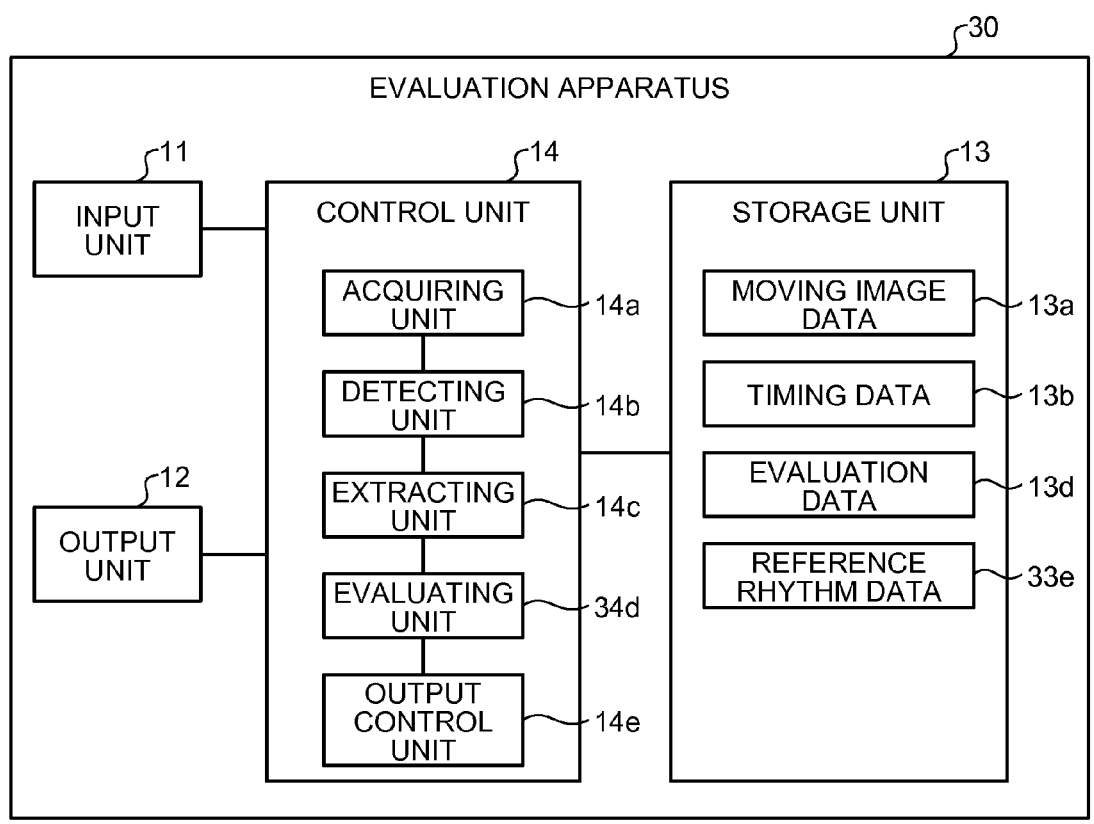
FIG. 14 is an example block diagram of a configuration of an evaluation apparatus according to a third embodiment.

FIG. 14 is an example block diagram of a configuration of the evaluation apparatus according to the third embodiment. The evaluation apparatus 30 according to the third embodiment is different from the evaluation apparatus 10 according to the first embodiment in that it includes an evaluating unit 34d instead of the evaluating unit 14d and stores reference rhythm data 33e in the storage unit 13.

The reference rhythm data 33e stored in the storage unit 13 is a rhythm pattern acquired from sound information, for example, and will be described later in greater detail.

The evaluating unit 34d evaluates coincidence of rhythm patterns between a reference rhythm acquired from sound information and a motion rhythm based on the timing data 13b acquired from the moving image data 13a. Specifically, the evaluating unit 34d acquires the reference rhythm from music reproduced by a karaoke machine, for example. The evaluating unit 34d also acquires the motion rhythm using captured images obtained by capturing a person who is singing to the reproduced music as the moving image data 13a. The evaluating unit 34d compares the rhythm patterns of the reference rhythm of the reproduced music and that of the motion rhythm of the person who is singing to the reproduced music, thereby evaluating the coincidence therebetween. In other words, the evaluating unit 34d enhances the evaluation as the rhythm patterns of the reference rhythm and that of the motion rhythm are more coincident with each other.

The evaluating unit 34d acquires the sound information. Examples of the sound information may include a sound collected by a microphone (not illustrated), music reproduced by the karaoke machine, and the moving image data 13a recorded with a video camera (not illustrated) and stored in the storage unit 13. Examples of the sound information may also include musical instrument digital interface (MIDI).

The evaluating unit 34d acquires the reference rhythm from the acquired sound information. The evaluating unit 34d performs processing such as beat tracking and rhythm recognition on the sound information, thereby acquiring the reference rhythm. To perform beat tracking and rhythm recognition, several technologies may be used, including a technology described in a non-patent literature ("the Institute of Electronics, Information and Communication Engineers, "Knowledge Base", Volume 2, Section 9, Chapter 2, 2-4, Audio Alignment, Beat Tracking, Rhythm Recognition" Online, Searched on Dec. 17, 2013, the URL http://www.ieice-hbkb.org/portal/doc_557.html).

Figure 15:
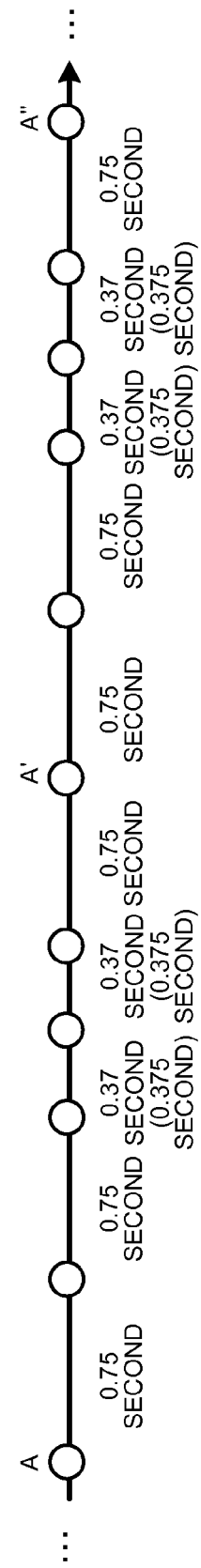
FIG. 15 is an example diagram of acquisition of a reference rhythm based on sound information.

FIG. 15 is an example diagram of acquisition of a reference rhythm based on sound information. In the acquired reference rhythm illustrated in the example in FIG. 15, timings of taking a beat are represented by circles and occur at differences of "0.75 second", "0.75 second", "0.37 second", "0.37 second", and "0.75 second" from the timing A. The evaluating unit 34d may express each timing by accumulating time from the timing A, which is the first timing, for example.

In the reference rhythm illustrated in the example in FIG. 15, the rhythm pattern between timings A-A' is identical to the rhythm pattern between timings A'-A". The evaluating unit 34d may acquire the reference rhythm not in units of a difference between timings but in units of a rhythm pattern. In the example in FIG. 15, the length of the rhythm pattern is three seconds per pattern, that is, between the timings A-A'. The evaluating unit 34d can also acquire the speed of the rhythm, that is, the length of the beat (tempo) from the acquired reference rhythm. In the example in FIG. 15, the tempo is 80 beats per minute (BPM), where "0.75 second" corresponds to one beat, for example.

In a case where the reference rhythm is acquired with respect to a sound collected by a microphone (not illustrated), for example, the evaluating unit 34d may sequentially acquire the reference rhythm based on the successively acquired sound information. In this case, the evaluating unit 34d can acquire the reference rhythm substantially in real time. The evaluating unit 34d may acquire the reference rhythm of a song from the whole of the song, for example. In this case, the evaluating unit 34d stores the acquired reference rhythm in the storage unit 13 as the reference rhythm data 33e. In other words, the evaluating unit 34d acquires the reference rhythm of the whole song.

Furthermore, the evaluating unit 34d may acquire the reference rhythm based on a partial section of a song. A song possibly has a constant rhythm over the whole thereof. In this case, the evaluating unit 34d can acquire a rhythm of a partial section and apply the rhythm to the whole of the song without acquiring the reference rhythm of the whole song. In a case where the reference rhythm in FIG. 15 is a partial section of a song, for example, the evaluating unit 34d may acquire the rhythm pattern between the timings A-A' as the reference rhythm. In this case, repetition of the rhythm pattern constitutes the whole song.

The evaluating unit 34d may store a pre-generated reference rhythm in the storage unit 13 as the reference rhythm data 33e. The pre-generated reference rhythm is a reference rhythm corresponding to a song generated based on the musical score of the song, for example. The evaluating unit 34d may generate the reference rhythm based on a partial section of the song as described above. The evaluating unit 34d may acquire the reference rhythm based on MIDI data, for example. Because MIDI data includes information on a tempo, the evaluating unit 34d can acquire the reference rhythm using the information. The evaluating unit 34d may use sound information output in parallel with a plurality of images, that is, with a moving image to acquire the reference rhythm. In other words, the evaluating unit 34d can use audio and a moving image included in a moving image with audio as the sound information and moving image data 13a, respectively.

When the evaluating unit 34d receives registration information indicating that the timing data 13b is stored in the storage unit 13 from the extracting unit 14c, the evaluating unit 34d performs evaluation processing on the timing data 13b. The evaluating unit 34d acquires time of timings of taking a beat from the timing data 13b. Based on the time of timings of taking a beat, the evaluating unit 34d calculates a time difference corresponding to a difference between timings of taking a beat. In other words, the evaluating unit 34d calculates a time difference corresponding to the frame difference in the first and the second embodiments instead of the frame difference.

The evaluating unit 34d calculates a difference between a preceding time difference and a target time difference. In other words, the evaluating unit 34d acquires the difference between the time differences as a motion rhythm. The evaluating unit 34d compares the reference rhythm with the motion rhythm. The following describes a case where the comparison is made using a rhythm pattern of a partial section, for example.

The evaluating unit 34d can acquire the reference rhythm and the motion rhythm from the moving image data 13a, which is captured images including a person who is singing to reproduced music as a capturing target, for example. In other words, the evaluating unit 34d can acquire the reference rhythm by extracting a rhythm from the music reproduced from the moving image data 13a. Furthermore, the evaluating unit 34d can acquire the motion rhythm from the moving image data 13a, which is captured images including the person who is singing to the reproduced music as a capturing target.

The evaluating unit 34d uses a predetermined rhythm pattern as the reference rhythm, for example, thereby determining whether the motion rhythm includes a rhythm pattern coincident with the predetermined rhythm pattern. The evaluating unit 34d determines that rhythm patterns coincide with each other in a case where the total of the gaps in the time differences included in the rhythm patterns between the reference rhythm and the motion rhythm is equal to or smaller than 0.4 second, for example.

The evaluating unit 34d calculates the number of times the rhythm patterns coincide with each other between the reference rhythm and the motion rhythm. The evaluating unit 34d, for example, calculates the number of times the rhythm patterns coincide with each other in a song. The evaluating unit 34d derives an evaluation based on the calculated number of times the rhythm patterns coincide with each other. The evaluating unit 34d may derive the evaluation by calculating the score on the basis of 100 points based on Equation (3), for example.

$$\text{Scored Points} \atop (\text{Out of 100})} = \quad (3)$$

$$\text{Basic} \atop \text{Points}} + \frac{\text{Number of Patterns Coincident with a Reference}}{\text{Number of Repetition of a Pattern(As a Whole)}} \times \left(100 - \text{Basic} \atop \text{Points}\right)$$

In Equation (3), "basic points" represent the least acquirable points, such as 50 points. "Number of repetition of a pattern (as a whole)" represents the number of repetition of a rhythm pattern in a whole song, for example. "Number of patterns coincident with a reference" represents the number of times the rhythm patterns coincide with each other.

The evaluating unit 34d stores the derived evaluation in the storage unit 13 as the evaluation data 13d and outputs the evaluation to the output control unit 14e.

The following describes a flow of processing performed by the evaluation apparatus 30 according to the third embodiment. The flow of processing performed by the evaluation apparatus 30 according to the third embodiment is the same as the operation of the evaluation apparatus 10 according to the first embodiment except for the evaluation processing performed by the evaluating unit 34d. The following describes the evaluation processing and omits the explanation of the other processing.

Figure 16:
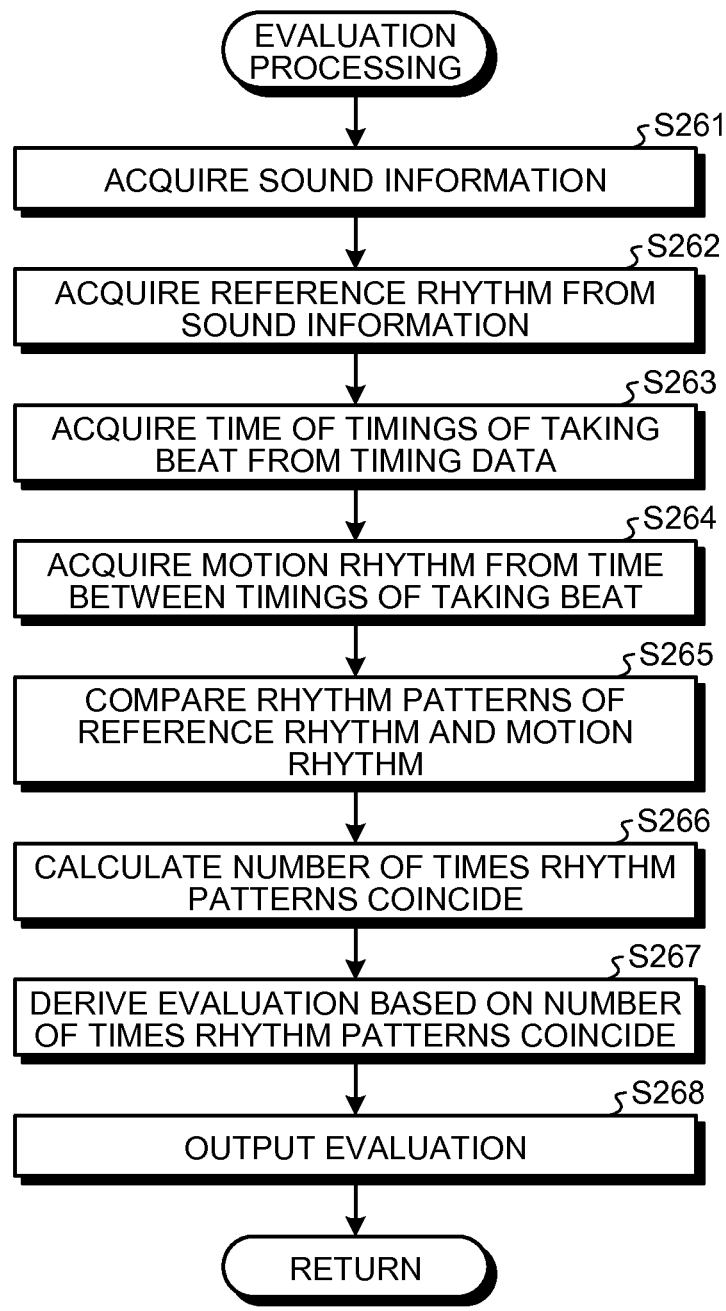
FIG. 16 is an example flowchart of evaluation processing according to the third embodiment.

FIG. 16 is an example flowchart of the evaluation processing according to the third embodiment. The evaluating unit 34d acquires sound information (S261). The evaluating unit 34d acquires a reference rhythm from the acquired sound information (S262).

The evaluating unit 34d acquires time of timings of taking a beat from the timing data 13b (S263). Based on the time of timings of taking a beat, the evaluating unit 34d calculates a time difference corresponding to a difference between timings of taking a beat. The evaluating unit 34d calculates a difference between a preceding time difference and a target time difference. The evaluating unit 34d acquires the difference between the time differences as a motion rhythm. In other words, the evaluating unit 34d acquires the motion rhythm from the time of timings of taking a beat (S264).

The evaluating unit 34d, for example, compares rhythm patterns of the reference rhythm and that of the motion rhythm (S265). The evaluating unit 34d calculates the number of times the rhythm patterns coincide with each other between the reference rhythm and the motion rhythm (S266). The evaluating unit 34d derives an evaluation based on the calculated number of times the rhythm patterns coincide with each other (S267). The evaluating unit 34d, for example, calculates how many points the score is worth out of 100 points based on Equation (3) as the evaluation. The evaluating unit 34d stores the derived evaluation in the storage unit 13 as the evaluation data 13d and outputs the evaluation to the output control unit 14e (S268). The output control unit 14e displays the evaluation received from the evaluating unit 34d on a monitor (not illustrated) via the output unit 12, for example. Thus, it is possible to evaluate the coincidence between the rhythm pattern extracted from the reproduced music, which is the sound information, and the rhythm pattern acquired from the moving image obtained by capturing the person in the evaluation processing, for example.

As described above, the evaluation apparatus 30 compares a rhythm indicated by a motion of a person taking a beat or a timing at which the person takes a beat with the reference rhythm, thereby outputting an evaluation on the rhythm of the motion of the person. Thus, the evaluation apparatus 30 can enhance the evaluation correspondingly to the number of timings at which the rhythms coincide with each other.

Furthermore, the evaluation apparatus 30 uses the reference rhythm including a rhythm acquired based on the sound information output in parallel with the images. Thus, the evaluation apparatus 30 can evaluate the coincidence between the rhythm of the sound information and the rhythm of the motion of the person included in the moving image.

The evaluation apparatus 30 makes an evaluation on a motion of a person who is singing to reproduced music based on a rhythm extracted from the reproduced music and a rhythm in which the person who is singing takes a beat, which is acquired from captured images including the person who is singing as a capturing target, and outputs a result of the evaluation. Thus, the evaluation apparatus 30 can evaluate the coincidence between the rhythm extracted from the reproduced music and the rhythm of the person who is singing to the reproduced music.

While the coincidence between the reference rhythm and the motion rhythm has been described in the embodiment above, the coincidence is not limited to temporal coincidence. For example, the coincidence between rhythm patterns may be evaluated as follows: even if the start time of the rhythm patterns does not coincide between the reference rhythm and the motion rhythm, the evaluation can be enhanced in a case where the degree of coincidence between the rhythm patterns is high. By allowing such a temporal gap, it is possible to enhance the evaluation even in a case where the person takes a rhythm at a timing of an upbeat, for example.

While the embodiments of the disclosed apparatus have been described, the present invention may be embodied in various different aspects besides the embodiments above.

Figure 17:
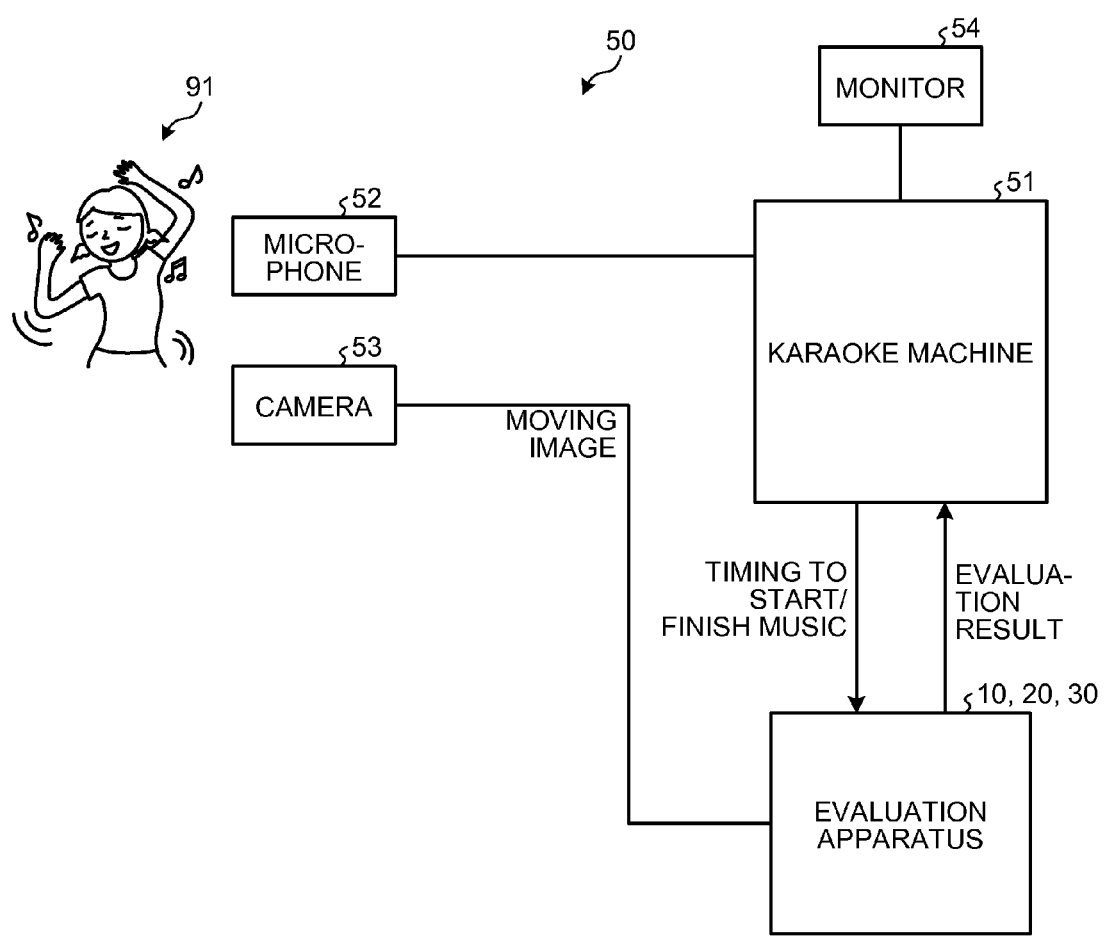
FIG. 17 is an example diagram of a system in a case where the evaluation apparatus operates in conjunction with a karaoke machine.

The evaluation apparatus 10 may evaluate a rhythm of a person in real time in conjunction with a karaoke machine provided in a karaoke box. Extraction in real time includes an aspect in which processing is serially performed on an input frame to sequentially output a processing result, for example. While the following describes the case of using the evaluation apparatus 10 according to the first embodiment as an evaluation apparatus, the evaluation apparatus 20 according to the second embodiment or the evaluation apparatus 30 according to the third embodiment may be used. FIG. 17 is an example diagram of a system in a case where the evaluation apparatus operates in conjunction with a karaoke machine. A system 50 illustrated in the example in FIG. 17 includes a karaoke machine 51, a microphone 52, a camera 53, a monitor 54, and the evaluation apparatus 10. The karaoke machine 51 reproduces music specified by a person 91 who performs karaoke and outputs the music from a speaker (not illustrated) for the person 91. This enables the person 91 to sing the reproduced music with the microphone 52 and dance to the music. The karaoke machine 51 transmits a message indicating that it is a timing to start reproduction of music to the evaluation apparatus 10 at a timing to start reproduction of the music. The karaoke machine 51 also transmits a message indicating that it is a timing to finish reproduction of music to the evaluation apparatus 10 at a timing to finish reproduction of the music.

When the evaluation apparatus 10 receives the message indicating that it is a timing to start reproduction of music, the evaluation apparatus 10 transmits an instruction to start image capturing to the camera 53. When the camera 53 receives the instruction to start image capturing, the camera 53 starts to capture an image of the person 91 included in an image capturing range. The camera 53 sequentially transmits frames of the moving image data 13a obtained by the image capturing to the evaluation apparatus 10.

Sound information including audio of the person who is singing a song and dancing to the reproduced music, which is collected by the microphone 52, and the reproduced music is sequentially transmitted to the evaluation apparatus 10 via the karaoke machine 51. The sound information is output in parallel with the frames of the moving image data 13a.

When the evaluation apparatus 10 receives the frames transmitted from the camera 53, the evaluation apparatus 10 performs the various types of processing described above on the received frames in real time. Thus, the evaluation apparatus 10 extracts timings at which the person 91 takes a beat and registers various types of information in the timing data 13b. The evaluation apparatus 10 compares the rhythm indicated by the timings at which the person 91 takes a beat registered in the timing data 13b with the rhythm of the reproduced music, thereby evaluating the dance of the person 91. The evaluation apparatus 10 then transmits the evaluation result to the karaoke machine 51.

When the karaoke machine 51 receives the evaluation result, the karaoke machine 51 displays the received evaluation result on the monitor 54. This enables the person 91 to grasp the evaluation result in real time.

When the evaluation apparatus 10 receives the message indicating that it is a timing to finish reproduction of music from the karaoke machine 51, the evaluation apparatus 10 transmits an instruction to stop image capturing to the camera 53. When the camera 53 receives the instruction to stop image capturing, the camera 53 stops image capturing.

As described above, the evaluation apparatus 10 in the system 50 can extract the rhythm of the person in real time in conjunction with the karaoke machine 51 provided in the karaoke box, thereby evaluating the dance of the person.

Figure 18:
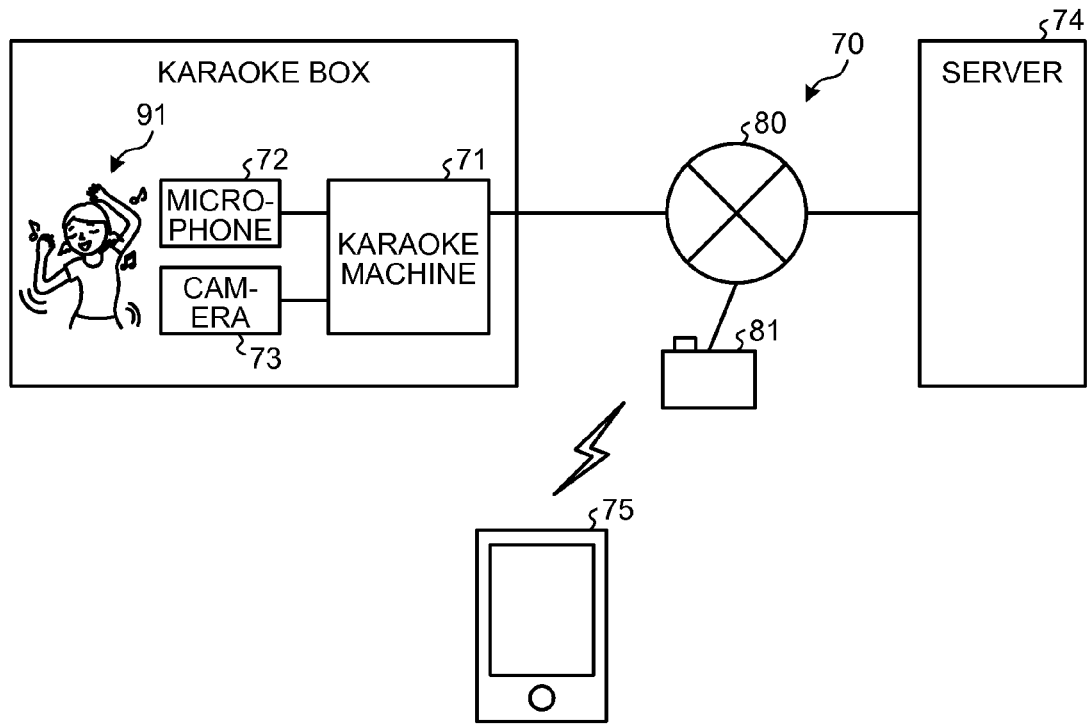
FIG. 18 is an example diagram of a system including a server.

A server provided outside of the karaoke box may have the same functions as the various types of functions of the evaluation apparatus 10. In this case, the server extracts the rhythm of the person in real time, thereby evaluating the dance of the person. While the following describes the case of using the evaluation apparatus 10 according to the first embodiment as an evaluation apparatus, the evaluation apparatus 20 according to the second embodiment or the evaluation apparatus 30 according to the third embodiment may be used. FIG. 18 is an example diagram of a system including a server. A system 70 illustrated in the example in FIG. 18 includes a karaoke machine 71, a microphone 72, a camera 73, a server 74, and a mobile terminal 75. The karaoke machine 71 reproduces music specified by the person 91 who performs karaoke and outputs the music from a speaker (not illustrated) for the person 91. This enables the person 91 to sing the reproduced music with the microphone 72 and dance to the music. The karaoke machine 71 transmits an instruction to start image capturing to the camera 73 at a timing to start reproduction of the music. The karaoke machine 71 also transmits an instruction to stop image capturing to the camera 73 at a timing to finish reproduction of the music.

When the camera 73 receives the instruction to start image capturing, the camera 73 starts to capture an image of the person 91 included in an image capturing range. The camera 73 sequentially transmits frames of the moving image data 13a obtained by the image capturing to the karaoke machine 71. When the karaoke machine 71 receives the frames transmitted from the camera 73, the karaoke machine 71 sequentially transmits the received frames to the server 74 via a network 80. Furthermore, the karaoke machine 71 sequentially transmits sound information including audio of the person who is singing a song and dancing to the reproduced music, which is collected by the microphone 72, and the reproduced music to the server 74 via the network 80. The sound information is output in parallel with the frames of the moving image data 13a.

The server 74 performs processing similar to the various types of processing performed by the evaluation apparatus 10 in real time on the frames transmitted from the karaoke machine 71. Thus, the server 74 extracts timings at which the person 91 takes a beat and registers various types of information in the timing data 13b. The server 74 compares the rhythm indicated by the timings at which the person 91 takes a beat registered in the timing data 13b with the rhythm of the music based on the data of the audio transmitted from the karaoke machine 71, thereby evaluating the dance of the person 91. The server 74 then transmits the evaluation result to the mobile terminal 75 of the person 91 via the network 80 and a base station 81.

When the mobile terminal 75 receives the evaluation result, the mobile terminal 75 displays the received evaluation result on its display. This enables the person 91 to grasp the evaluation result in real time. Furthermore, the person 91 can grasp the evaluation result on the mobile terminal 75 of the person 91.

The server 74 may acquire the moving image data 13a from the karaoke machine 71 and perform processing similar to the various types of processing performed by the evaluation apparatus 10 not in real time. Thus, the server 74 extracts timings at which the person 91 takes a beat and registers various types of information in the timing data 13b. In this case, the server 74 compares the rhythm indicated by the timings at which the person 91 takes a beat registered in the timing data 13b with the rhythm of the music based on the data of the audio transmitted from the karaoke machine 71, thereby evaluating the dance of the person 91. The server 74 then transmits the evaluation result to the mobile terminal 75 of the person 91 via the network 80 and the base station 81.

The detecting unit 14b and the extracting unit 14c may perform processing described below. The detecting unit 14b selects each of a plurality of frames as an extraction candidate frame. Every time the detecting unit 14b extracts one extraction candidate frame, the detecting unit 14b performs the following processing. The detecting unit 14b determines whether a background difference amount decreases from a frame a predetermined number ahead of the extraction candidate frame to the extraction candidate frame and increases from the extraction candidate frame to a frame a predetermined number behind the extraction candidate frame. If the detecting unit 14b determines that the background difference amount decreases from the frame the predetermined number ahead of the extraction candidate frame to the extraction candidate frame and increases from the extraction candidate frame to the frame the predetermined number behind the extraction candidate frame, the detecting unit 14b performs the following processing. The detecting unit 14b detects time when the extraction candidate frame is captured. The detecting unit 14b performs the processing described above on all the frames. The extracting unit 14c extracts the time detected by the detecting unit 14b as a timing at which the person takes a beat from the timings at which the respective frames are captured. In other words, the extracting unit 14c extracts a motion of the person taking a beat from the motions of the person indicated by the respective frames.

The processing at each step in the processing described in the embodiments may be optionally distributed or integrated depending on various types of loads and usage, for example. Furthermore, a step may be omitted.

The order of processing at each step in the processing described in the embodiments may be changed depending on various types of loads and usage, for example.

The components of each apparatus illustrated in the drawings are functionally conceptual and are not necessarily physically configured as illustrated. In other words, the specific aspects of distribution and integration of each apparatus are not limited to those illustrated in the drawings. All or a part of the components may be distributed or integrated functionally or physically in desired units depending on various types of loads and usage, for example. The camera 53 according to the embodiments may be connected to the karaoke machine 51 to be made communicable with the evaluation apparatus 10, 20, or 30 via the karaoke machine 51, for example. Furthermore, the functions of the karaoke machine 51 and the evaluation apparatus 10, 20, or 30 according to the embodiments may be provided by a single computer, for example.

Detection Program

Figure 19:
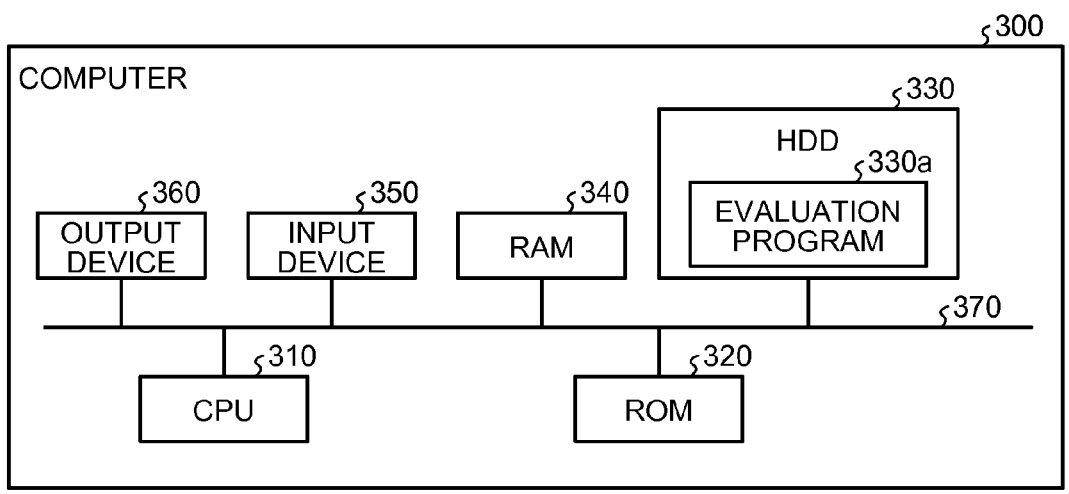
FIG. 19 is a diagram of a computer that executes an evaluation program.

The various types of processing performed by the evaluation apparatuses 10, 20, and 30 described in the embodiments may be performed by a computer system, such as a personal computer and a workstation, executing a computer program prepared in advance. The following describes an example of a computer that executes an evaluation program having functions similar to those of the evaluation apparatus according to any one of the first to the third embodiments with reference to FIG. 19. FIG. 19 is a diagram of a computer that executes the evaluation program.

As illustrated in FIG. 19, a computer 300 includes a CPU 310, a read only memory (ROM) 320, a hard disk drive (HDD) 330, a random access memory (RAM) 340, an input device 350, and an output device 360. These devices 310, 320, 330, 340, and 350 are connected via a bus 370.

The ROM 320 stores therein a basic program such as an operating system (OS). The HDD 330 stores therein in advance an evaluation program 330a that exerts functions similar to those of the acquiring unit 14a, the detecting unit 14b, the extracting unit 14c, the evaluating unit 14d, 24d, or 34d, and the output control unit 14e described in the embodiments. The HDD 330 stores therein in advance the moving image data 13a, the timing data 13b, and the evaluation data 13d.

The CPU 310 reads and executes the evaluation program 330a from the HDD 330. The CPU 310 reads the moving image data 13a, the timing data 13b, and the evaluation data 13d from the HDD 330 and stores these data in the RAM 340. The CPU 310 uses the various types of data stored in the RAM 340, thereby executing the evaluation program 330a. All the data stored in the RAM 340 are not always stored in the RAM 340. Only data used for processing may be stored in the RAM 340.

The evaluation program 330a is not necessarily stored in the HDD 330 from the first. The evaluation program 330a, for example, is stored in a "portable physical medium" inserted into the computer 300, such as a flexible disk (FD), a compact disc read only memory (CD-ROM), a digital versatile disc (DVD), a magneto-optical disc, and an integrated circuit (IC) card. The computer 300 may read and execute the evaluation program 330a from the medium.

Alternatively, the evaluation program 330a is stored in "another computer (or a server)" connected to the computer 300 via a public line, the Internet, a local area network (LAN), and a wide area network (WAN), for example. The computer 300 may read and execute the evaluation program 330a from the computer or the server.

The present invention can evaluate a rhythm of a motion of a person from a captured image.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A non-transitory computer-readable recording medium having stored therein an evaluation program, the evaluation program causing a computer to execute a process comprising:
   calculating a background difference amount of each of a plurality of frames obtained by sequential image capturing as a number of pixels that are included in a frame and a difference between brightness of which and background data calculated from frames that are obtained before the frame is larger than a threshold;
   detecting, from among the plurality of frames, beat frames, wherein the background difference amount of a beat frame is smaller than background difference amounts of frames sequentially obtained just before the beat frame that continually decrease, and the background difference amount of the beat frame is also smaller than background difference amounts of frames sequentially obtained just after the beat frame that continually increase, the beat frame indicating a timing at which a person displayed in the plurality of frames takes a beat; and
   outputting an evaluation on a rhythm of a motion of the person based on a rhythm indicated by the beat frames.

2. The non-transitory computer-readable recording medium having stored therein the evaluation program according to claim 1, the evaluation program causing the computer to execute the process further comprising:
   calculating a beat difference for a beat frame as a difference between a first frame difference that is a number of frames existing from the beat frame to a beat frame prior to the beat frame and a second frame difference that is a number of frames existing from the beat frame to a beat frame next to the beat frame; and
   performing control such that a score of the evaluation increases with a decrease in the beat difference.

3. The non-transitory computer-readable recording medium having stored therein the evaluation program according to claim 2, the evaluation program causing the computer to execute the process further comprising, making an evaluation such that the score of the evaluation increases with an increase in a number of beat differences for respective beat frames, the beat differences being equal to or smaller than a predetermined value.

4. The non-transitory computer-readable recording medium having stored therein the evaluation program according to claim 2, the evaluation program causing the computer to execute the process further comprising, making an evaluation such that the score of the evaluation increases correspondingly to consecutiveness of beat differences for respective beat frames, the beat differences being equal to or smaller than a predetermined value.

5. The non-transitory computer-readable recording medium having stored therein the evaluation program according to claim 1, the evaluation program causing the computer to execute the process further comprising, outputting the evaluation on the rhythm of the motion of the person based on a comparison of the rhythm indicated by the beat frames with a reference rhythm.

6. The non-transitory computer-readable recording medium having stored therein the evaluation program according to claim 5, wherein, the reference rhythm includes a rhythm acquired based on sound information output in parallel with the plurality of frames.

7. The non-transitory computer-readable recording medium according to claim 1, the process further comprising:
   counting a frame difference as a number of frames that exist from a beat frame to a beat frame prior or next thereto, wherein
   the outputting includes outputting an evaluation on a rhythm of a motion of the person based on the counted frame difference.

8. An evaluation method comprising:
   calculating, using a processor, a background difference amount of each of a plurality of frames obtained by sequential image capturing as a number of pixels that are included in a frame and a difference between brightness of which and background data calculated from frames that are obtained before the frame is larger than a threshold;
   detecting, from among the plurality of frames, beat frames, wherein the background difference amount of a beat frame is smaller than background difference amounts of frames sequentially obtained just before the beat frame that continually decrease, and the background difference amount of the beat frame is also smaller than background difference amounts of frames sequentially obtained just after the beat frame that continually increase, the beat frame indicating a timing at which a person displayed in the plurality of frames take a beat; and
   outputting, using the processor, an evaluation on a rhythm of a motion of the person based on a rhythm indicated by the beat frames.

9. An evaluation apparatus, comprising:
   a memory; and
   a processor coupled to the memory, wherein the processor executes a process comprising:
   calculating a background difference amount of each of a plurality of frames obtained by sequential image capturing as a number of pixels that are included in a frame and a difference between brightness of which and background data calculated from frames that are obtained before the frame is larger than a threshold;
   detecting, from among the plurality of frames, beat frames, wherein the background difference amount of a beat frame is smaller than background difference amounts of frames sequentially obtained just before the beat frame that continually decrease, and the background difference amount of the beat frame is also smaller than background difference amounts of frames sequentially obtained just after the beat frame that continually increase, the beat frame indicating a timing at which a person displayed in the plurality of frames takes a beat; and
   outputting an evaluation on a rhythm of a motion of the person based on a rhythm indicated by the beat frames.

* * * * *